US012482414B2

(12) United States Patent
Feng et al.

(10) Patent No.: US 12,482,414 B2
(45) Date of Patent: Nov. 25, 2025

(54) DISPLAY DEVICE, METHOD AND DEVICE FOR ADJUSTING SAME, AND COMPUTER STORAGE MEDIUM

(71) Applicants: Hefei BOE Joint Technology Co., Ltd., Anhui (CN); BOE Technology Group Co., Ltd., Beijing (CN)

(72) Inventors: Xuehuan Feng, Beijing (CN); Song Meng, Beijing (CN)

(73) Assignees: HEFEI BOE JOINT TECHNOLOGY CO., LTD., Anhui (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/288,577

(22) PCT Filed: Nov. 25, 2022

(86) PCT No.: PCT/CN2022/134350
§ 371 (c)(1),
(2) Date: Oct. 27, 2023

(87) PCT Pub. No.: WO2024/108546
PCT Pub. Date: May 30, 2024

(65) Prior Publication Data

US 2025/0095564 A1 Mar. 20, 2025

(51) Int. Cl.
*G09G 3/3225* (2016.01)

(52) U.S. Cl.
CPC ... *G09G 3/3225* (2013.01); *G09G 2320/0242* (2013.01); *G09G 2320/0252* (2013.01)

(58) Field of Classification Search
CPC ...... G09G 3/32; G09G 3/3233; G09G 3/3225; G09G 2320/0242; G09G 2320/0252
See application file for complete search history.

(56) References Cited

U.S. PATENT DOCUMENTS 9,378,678 B1 * 6/2016 Lee .................... G09G 3/2003
9,702,919 B2 * 7/2017 Amatsuchi ......... G01M 11/0264
2007/0030284 A1 * 2/2007 Ogasawara .......... H04N 9/3114
345/589

(Continued)

FOREIGN PATENT DOCUMENTS

CN 1991458 A 7/2007
CN 102231251 A 11/2011

(Continued)

*Primary Examiner* — David Tung
(74) *Attorney, Agent, or Firm* — XSENSUS LLP

(57) ABSTRACT

Provided is a display device. The display device includes: a display panel and a control assembly; wherein the display panel includes a base substrate, a plurality of first color light-emitting units, and a sensing unit, wherein the sensing unit is electrically connected to the plurality of first color light-emitting units to acquire a plurality of sensing values; the control assembly is electrically connected to the sensing unit, and configured to acquire a plurality of rearranged sensing values by rearranging the plurality of sensing values; and the control assembly is further configured to adjust the plurality of first color light-emitting units in the display panel based on the plurality of rearranged sensing values.

20 Claims, 15 Drawing Sheets

(56) References Cited

U.S. PATENT DOCUMENTS

| | | | | |
|---|---|---|---|---|
| 2009/0295782 | A1 | 12/2009 | Lee et al. | |
| 2017/0132979 | A1 | 5/2017 | Oh et al. | |
| 2018/0061292 | A1* | 3/2018 | Hong | G09G 3/3233 |
| 2019/0057657 | A1 | 2/2019 | Liu et al. | |
| 2019/0287452 | A1 | 9/2019 | Wang | |
| 2021/0225274 | A1 | 7/2021 | Chu et al. | |
| 2021/0295776 | A1 | 9/2021 | Kim et al. | |
| 2023/0154410 | A1 | 5/2023 | Feng et al. | |
| 2024/0029601 | A1* | 1/2024 | He | G09G 3/006 |
| 2025/0095545 | A1* | 3/2025 | Yin | G09G 3/32 |

FOREIGN PATENT DOCUMENTS

| | | | |
|---|---|---|---|
| CN | 104392691 | A | 3/2015 |
| CN | 105047129 | A | 11/2015 |
| CN | 106683618 | A | 5/2017 |
| CN | 106887212 | A | 6/2017 |
| CN | 108492779 | A | 9/2018 |
| CN | 110073433 | A | 7/2019 |
| CN | 110967862 | A | 4/2020 |
| CN | 113284466 | A | 8/2021 |
| CN | 113409736 | A | 9/2021 |
| CN | 113436572 | A | 9/2021 |
| WO | 2022/082703 | A1 | 4/2022 |

* cited by examiner

Second sensing value — First sensing value

| | | | | |
|---|---|---|---|---|
| 50 | 51 | 48 | 52 | 51 |
| 51 | 51 | 44 | 50 | 51 |
| 49 | 49 | 43 | 49 | 51 |
| 52 | 50 | 47 | 49 | 50 |
| 49 | 49 | 42 | 50 | 51 |

Second sensing value

| | | | | |
|---|---|---|---|---|
| 50 | 51 | 49 | 52 | 51 |
| 51 | 51 | 49 | 50 | 51 |
| 49 | 49 | 50 | 49 | 51 |
| 52 | 50 | 51 | 49 | 50 |
| 49 | 49 | 49 | 50 | 51 |

DISPLAY DEVICE, METHOD AND DEVICE FOR ADJUSTING SAME, AND COMPUTER STORAGE MEDIUM

CROSS-REFERENCE TO RELATED APPLICATION

This application is a U.S. national stage of international application No. PCT/CN2022/134350, filed on Nov. 25, 2022, the disclosure of which is incorporated herein by reference in its entirety.

TECHNICAL FIELD

The present disclosure relates to the field of display technologies, and in particular, relates to a display device, a method and a device for adjusting the same, and a computer storage medium.

BACKGROUND

Organic light emitting diode (OLED) display panels have merits of great color saturation, contrast, and response speed.

SUMMARY

Embodiments of the present disclosure provide a display device, a method and a device for adjusting the same, and a computer storage medium. The technical solutions are as follows.

According to some embodiments of the present disclosure, a display device is provided. The display device includes: a display panel and a control assembly; wherein the display panel includes a base substrate, and a plurality of first color light-emitting units and a sensing unit that are disposed on the base substrate, wherein the sensing unit is electrically connected to the plurality of first color light-emitting units to acquire a plurality of sensing values corresponding to the plurality of first color light-emitting units, wherein the plurality of sensing values include a plurality of first sensing values and a plurality of second sensing values, the plurality of first sensing values being abnormal sensing values, the plurality of second sensing values being normal sensing values, and a plurality of first color light-emitting units corresponding to the plurality of first sensing values being arranged successively;

the control assembly is electrically connected to the sensing unit, and configured to acquire a plurality of rearranged sensing values by rearranging the plurality of sensing values, wherein first color light-emitting units corresponding to at least some of the plurality of first sensing values in the plurality of rearranged sensing values are different from the first color light-emitting units corresponding to the at least some of the plurality of first sensing values prior to rearrangement; and the control assembly is further configured to adjust the plurality of first color light-emitting units in the display panel based on the plurality of rearranged sensing values.

In some embodiments, the sensing unit includes a plurality of sense transistors, a plurality of sense lines, and an analog-to-digital converter, and the plurality of first color light-emitting units in the display panel are arranged in rows and columns, wherein the plurality of sense transistors are in one-to-one correspondence to the plurality of first color light-emitting units, one of the plurality of sense lines is electrically connected to sense transistors corresponding to one column of the first color light-emitting units, an input terminal of the analog-to-digital converter is connected to the one of the plurality of sense lines, an output terminal of the analog-to-digital converter is electrically connected to the control assembly, and the plurality of first sensing values input by the analog-to-digital converter to the control assembly include at least one column of the first sensing values In some embodiments, the control assembly is further configured to: determine K sensing values for exchange from the plurality of second sensing values in a target region of the display panel, K being a positive integer; and acquire the plurality of rearranged sensing values by mutually exchanging the K sensing values for exchange with K first sensing values.

In some embodiments, differences between target first sensing values in the plurality of first sensing values and a first average value are less than or equal to a first predetermined difference, wherein the target first sensing values are first sensing values mutually exchanged with the K sensing values for exchange, and the first average value is an average value of two sensing values adjacent to any of the first sensing values in a row direction.

In some embodiments, a ratio of the first predetermined difference to the first average value ranges from 5% to 15%.

In some embodiments, the control assembly is further configured to:

determine second sensing values in the same row as the target first sensing values in the target region as target second sensing values; and determine the K sensing values for exchange from a plurality of target second sensing values.

In some embodiments, one first sensing value is defined in the target region, and the sensing value for exchange in the target region is a second sensing value with a minimum difference with the first sensing value in the target region.

In some embodiments, one target first sensing value is defined in the target region, and the sensing value for exchange in the target region is a second sensing value with a minimum difference with the target first sensing value in the target region.

In some embodiments, the control assembly is further configured to acquire the plurality of rearranged sensing values by randomly rearranging the plurality of sensing values in each row in the display panel.

In some embodiments, the control assembly is further configured to acquire the plurality of rearranged sensing values by randomly rearranging a plurality of first sensing values in one column of the first sensing values.

In some embodiments, the control assembly is further configured to: determine any of the sensing values as the first sensing value in response to the sensing value being greater than or less than two sensing values adjacent to the sensing values in a row direction; and determine sensing values in the plurality of sensing values other than the first sensing value as the plurality of second sensing values.

In some embodiments, the control assembly is further configured to:

determine any of the sensing values as a target sensing value in response to the sensing value being greater than or less than two sensing values adjacent to the sensing value in a row direction;

determine a plurality of sensing values in any column of the sensing values as the first sensing values in response to a ratio of a number of target sensing values in the any column of the sensing values in the display panel to a number of the column of the sensing values being greater than a predetermined ratio; and determine other columns of the sensing values than the column of the sensing values as the second sensing values.

In some embodiments, the predetermined ratio ranges from 70% to 100%.

In some embodiments, the control assembly is further configured to:

receive a display signal from a camera assembly, wherein the display signal is a plurality of luminance values corresponding to the plurality of first color light-emitting units in the display panel acquired by the camera assembly;

determine any of the first color light-emitting units as a target first color light-emitting unit in response to the luminance value of the first color light-emitting unit being greater than the luminance values of two first color light-emitting units adjacent to the sensing value in a row direction;

determine a sensing value corresponding to the target first color light-emitting unit as a first sensing value; and determine sensing values in the plurality of sensing values other than the first sensing value as the second sensing values.

According to some embodiments of the present disclosure, a method for adjusting a display device is provided. The method is applicable to the display device including a display panel and a control assembly. The method includes:

acquiring a plurality of sensing values corresponding to a plurality of first color light-emitting units in the display panel, wherein the plurality of sensing values include a plurality of first sensing values and a plurality of second sensing values, the plurality of first sensing values being abnormal sensing values, the plurality of second sensing values being normal sensing values, and a plurality of first color light-emitting units corresponding to the plurality of first sensing values being arranged successively;

acquiring a plurality of rearranged sensing values by rearranging the plurality of sensing values, wherein first color light-emitting units corresponding to at least some of the plurality of first sensing values in the plurality of rearranged sensing values are different from the first color light-emitting units corresponding to the at least some of the plurality of first sensing values prior to rearrangement; and adjusting the plurality of first color light-emitting units in the display panel based on the plurality of rearranged sensing values.

In some embodiments, the plurality of first color light-emitting units in the display panel are arranged in rows and columns, and the plurality of first sensing values includes at least one column of the first sensing values.

In some embodiments, acquiring the plurality of rearranged sensing values by rearranging the plurality of sensing values includes:

determining K sensing values for exchange from the plurality of second sensing values in a target region of the display panel, wherein K is a positive integer; and acquiring the plurality of rearranged sensing values by mutually exchanging the K sensing values for exchange with K first sensing values.

In some embodiments, differences between target first sensing values in the plurality of first sensing values and a first average value are less than or equal to a first predetermined difference, wherein the target first sensing values are first sensing values mutually exchanged with the K sensing values for exchange, and the first average value is an average value of two sensing values adjacent to any of the first sensing values in a row direction.

In some embodiments, a ratio of the first predetermined difference to the first average value ranges from 5% to 15%.

In some embodiments, determining the K sensing values for exchange from the plurality of second sensing values in the target region of the display panel includes:

determining second sensing values in the same row as the target first sensing values in the target region as target second sensing values; and determining the K sensing values for exchange from a plurality of target second sensing values.

In some embodiments, one first sensing value is defined in the target region, and the sensing value for exchange in the target region is a second sensing value with a minimum difference with the first sensing value in the target region.

In some embodiments, one target first sensing value is defined in the target region, and the sensing value for exchange in the target region is a second sensing value with a minimum difference with the target first sensing value in the target region.

In some embodiments, acquiring the plurality of rearranged sensing values by rearranging the plurality of sensing values includes:

acquiring the plurality of rearranged sensing values by randomly rearranging the plurality of sensing values in each row in the display panel.

In some embodiments, acquiring the plurality of rearranged sensing values by rearranging the plurality of sensing values includes:

acquiring the plurality of rearranged sensing values by randomly rearranging a plurality of first sensing values in one column of the first sensing values.

In some embodiments, prior to rearranging the plurality of sensing values, the method further includes:

determining any of the sensing values as the first sensing value in response to the sensing value being greater than or less than two sensing values adjacent to the sensing value in a row direction; and determining sensing values in the plurality of sensing values other than the first sensing value as the plurality of second sensing values.

In some embodiments, prior to rearranging the plurality of sensing values, the method further includes:

acquiring the plurality of sensing values corresponding to the plurality of first color light-emitting units in the display panel;

determining any of the sensing values as the target sensing value in response to the sensing value being greater than or less than two sensing values adjacent to the sensing value in a row direction;

determining a plurality of sensing values in any column of the sensing values as the first sensing values in response to a ratio of a number of target sensing values in the any column of the sensing values in the display panel to a number of the column of the sensing values being greater than a predetermined ratio; and determining other columns of the sensing values than the column of the sensing values as the second sensing values.

In some embodiments, the predetermined ratio ranges from 70% to 100%.

In some embodiments, prior to rearranging the plurality of sensing values, the method further includes:

acquiring a plurality of luminance values and the plurality of sensing values corresponding to the plurality of first color light-emitting units in the display panel;

determining any of the first color light-emitting units as a target first color light-emitting unit in response to the luminance value of the first color light-emitting unit being greater than the luminance values of two first color light-emitting units adjacent to the sensing value in a row direction;

determining a sensing value corresponding to the target first color light-emitting unit as a first sensing value; and determining sensing values in the plurality of sensing values other than the first sensing value as the second sensing value.

According to some embodiments of the present disclosure, an apparatus for adjusting a display device is provided. The device includes:

an acquiring module, configured to acquire a plurality of sensing values corresponding to a plurality of first color light-emitting units in the display panel, wherein the plurality of sensing values include a plurality of first sensing values and a plurality of second sensing values, the plurality of first sensing values being abnormal sensing values, the plurality of second sensing values being normal sensing values, and a plurality of first color light-emitting units corresponding to the plurality of first sensing values being arranged successively;

an arranging module, configured to acquire a plurality of rearranged sensing values by rearranging the plurality of sensing values, wherein first color light-emitting units corresponding to at least some of the plurality of first sensing values in the plurality of rearranged sensing values are different from the first color light-emitting units corresponding to the at least some of the plurality of first sensing values prior to rearrangement; and an adjusting module, configured to adjust the plurality of first color light-emitting units in the display panel based on the plurality of rearranged sensing values.

According to some embodiments of the present disclosure, a device for adjusting a display device is provided. The device for adjusting the display device includes a processor and a memory storing at least one instruction, at least one program, a code set, and an instruction set, wherein the processor, when loading and executing the at least one instruction, the at least one program, the code set, and the instruction set, is caused to perform the above method for adjusting the display device.

According to some embodiments of the present disclosure, a computer storage medium is provided. The computer storage medium stores at least one instruction, at least one program, a code set, and an instruction set, wherein the at least one instruction, the at least one program, the code set, and the instruction set, when loaded and executed by a processor, cause the processor to perform the above method for adjusting the display device.

According to some embodiments of the present disclosure, a computer program product or a computer program is provided. The computer program product or a computer program includes computer instructions stored in a computer-readable storage medium. A processor of the computer device reads the computer instructions from the computer-readable storage medium. The processor, when loading and executing the computer instructions, is caused to perform the above method for adjusting the display device.

BRIEF DESCRIPTION OF DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

Clear embodiments of the present disclosure are shown by the above accompanying drawings, and more detailed descriptions are shown hereinafter. The accompanying drawings and texts are not intended to limit the scope of the concept of the present disclosure in any way, but to describe the concept of the present disclosure for those skilled in the art with reference to specific embodiments.

DETAILED DESCRIPTION

To make the objectives, technical solutions, and advantages of the present disclosure clearer, the embodiments of the present disclosure are further described in detail hereinafter with reference to the accompanying drawings.

A display device typically includes a display panel and a control assembly. The control assembly externally compensates the display panel to reduce adverse effects of aged assemblies in the display panel. In detail, the display panel includes light-emitting units and a sensing unit that are electrically connected. The control assembly acquires sensing values corresponding to the light-emitting units by the light-emitting units in the display panel, and the sensing values are sensing potentials or sensing currents corresponding to the light-emitting units, such that an aging degree of the light-emitting unit is determined, and the light-emitting unit is further adjusted.

However, in the display device, the display screen of the display panel displays an abnormal region once a sensing unit is abnormal, such that the display effect of the display panel in the display device is poor.

Figure 1:
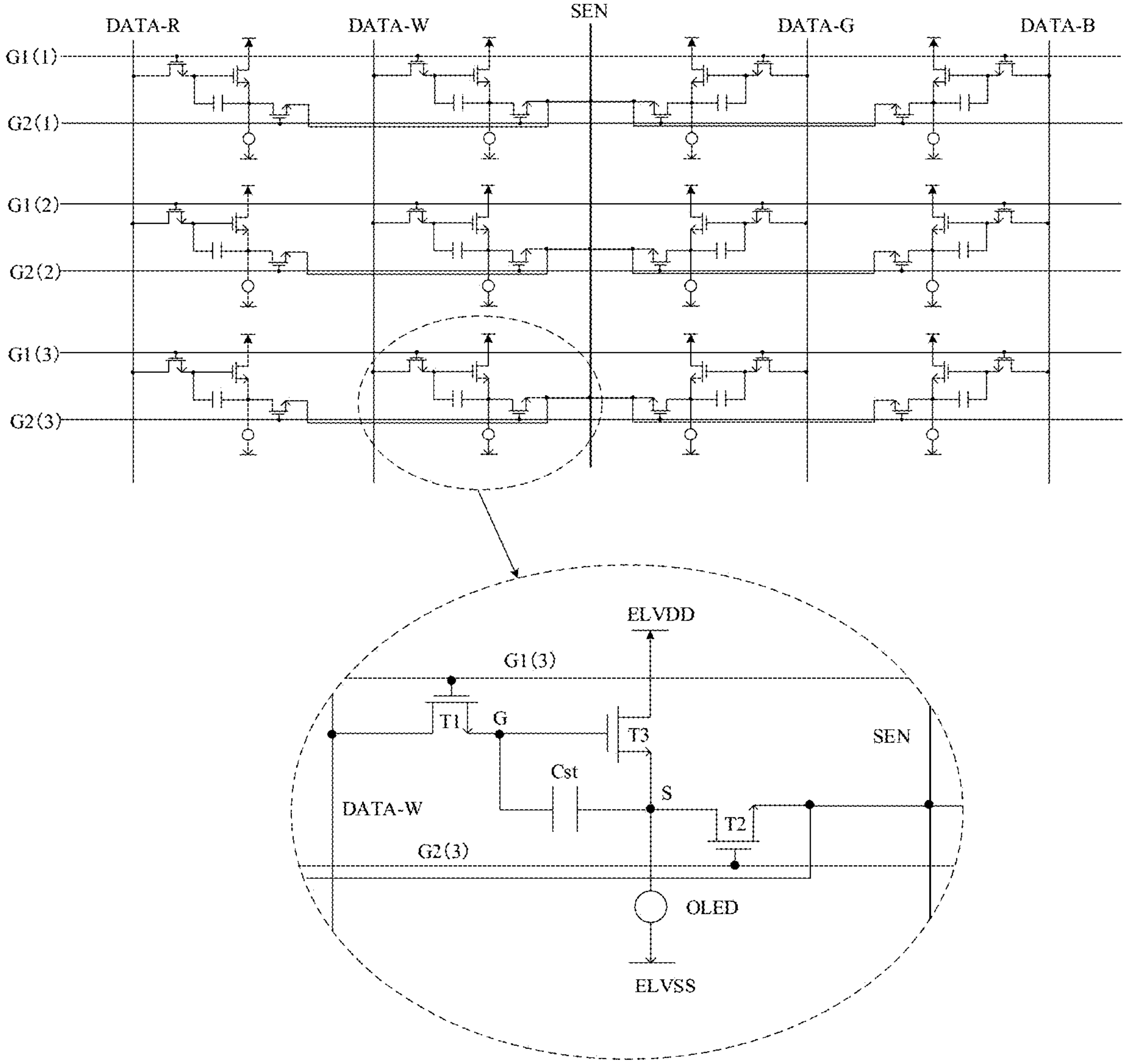
FIG. 1 is a schematic diagram of a circuit structure in a display panel.
Figure 2:
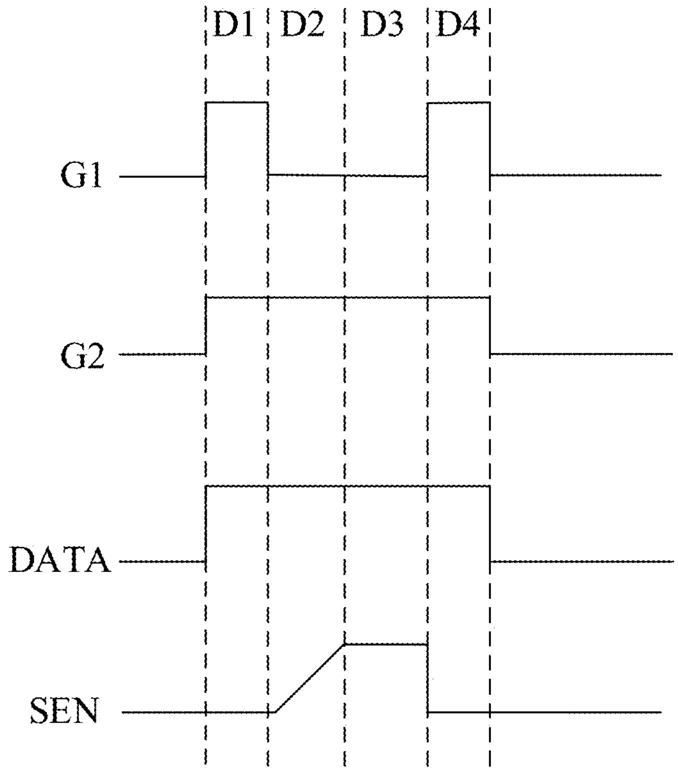
FIG. 2 is a schematic diagram of a working time sequence of the circuit structure shown in FIG. 1.

FIG. 1 is a schematic diagram of a circuit structure in a display panel, FIG. 2 is a schematic diagram of a working time sequence of the circuit structure shown in FIG. 1. Referring to FIG. 1 and FIG. 2, FIG. 1 shows a plurality of pixel circuits in a display substrate, and the plurality of pixel circuits in FIG. 1 are 3TIC pixel circuits. In detail, four pixel circuits connected to a scanning signal terminal G1(1) and a scanning signal terminal G2(1) are pixel circuits of pixel units in a first row of the display substrate, pixel circuits connected to a scanning signal terminal G1(2) and a scanning signal terminal G2(2) are pixel circuits of pixel units in a second row of the display substrate, and pixel circuits connected to a scanning signal terminal G1(3) and a scanning signal terminal G2(3) are pixel circuits of pixel units in a third row of the display substrate. Light-emitting units in the display panel include red light-emitting units (R) for emitting red light, white light-emitting units (W) for emitting white light, green light-emitting units (G) for emitting green light, and blue light-emitting units (B) for emitting blue light.

Taking a pixel unit in the third row in FIG. 1 as an example, the light-emitting unit in the pixel circuit is an organic light-emitting diode. The pixel circuit includes a data write transistor T1, a drive transistor T3, a sense transistor T2, and a storage capacitor Cst. A control terminal of the write transistor T1 is electrically connected to a first gate line G1, a control terminal of the sense transistor T2 is electrically connected to a second gate line G2, and a first electrode of the sense transistor T2 is electrically connected to a sensing signal line (SEN).

In light-emitting of the pixel circuit for display, the working process includes a data write display stage and an emission stage. In the data write display stage, the first gate line G1 controls the data write transistor T1 to be conducted, a data line (Data) writes a data voltage to a control electrode of the drive transistor T3, and a first electrode of the drive transistor T3 is electrically connected to a power supply line (ELVDD). In the emission stage, the drive transistor T3 outputs a corresponding drive current according to a voltage on the control terminal of the drive transistor T3 to drive the light-emitting units (such as, OLED) to emit light. The light units are electrically connected to a common ground terminal.

FIG. 2 is a schematic diagram of a working time sequence of the circuit structure in a compensation stage shown in FIG. 1. Upon end of a frame, the sense transistor T2 is employed to perform an outer compensated sense on the drive transistor T3 in the pixel circuit and the light-emitting units (such as, OLED), and perform an outer compensation (for example, the compensation of a threshold voltage of the drive transistor T3) on the pixel circuit based on a sensing result. The display panel further includes an analog-to-digital converter (ADC), and the sensing signal lines are electrically connected to an AC/DC conversion module.

The compensation stage includes a first stage D1 (a date write stage), a second stage D2 (a charge stage), a third stage D3 (a sample stage), and a fourth stage D4 (a data write-back stage). G1 and G2 in FIG. 2 represent time sequences of a scan signal terminal, DATA represents a time sequence of a data signal line, and SENSE represents a time sequence of receiving a voltage by a sense signal terminal.

In the first stage D1, the scan signal terminals G1 and G2 are high level signals capable of conducting the write transistor T1 and the sense transistor T2 in the pixel circuit row by row, and a data voltage output by the data signal line DATA is written to a first node G by the write transistor T1.

In the second stage D2, the scan signal terminal G1 is a low level signal, the scan signal terminal G2 is a high level signal, the write transistor T1 is off, the sense transistor T2 is on, the drive transistor T3 is on, and a second node S is charged. In this case, the sense signal line is in a floating state.

In the third stage D3, upon a period of charging the second node S, ADC is employed to detect a voltage of the second node S in the case that the voltage of the sense signal line is essentially unchanged.

In the fourth stage D4, the scan signal terminals G1 and G2 are high level signals capable of conducting the write transistor T1 and the sense transistor T2 in the pixel circuit row by row, and a data voltage output by the data signal line DATA is written to a first node G by the write transistor T1. The data voltage is a data voltage adjusted by ADC and input to the data signal terminal.

Figure 3:
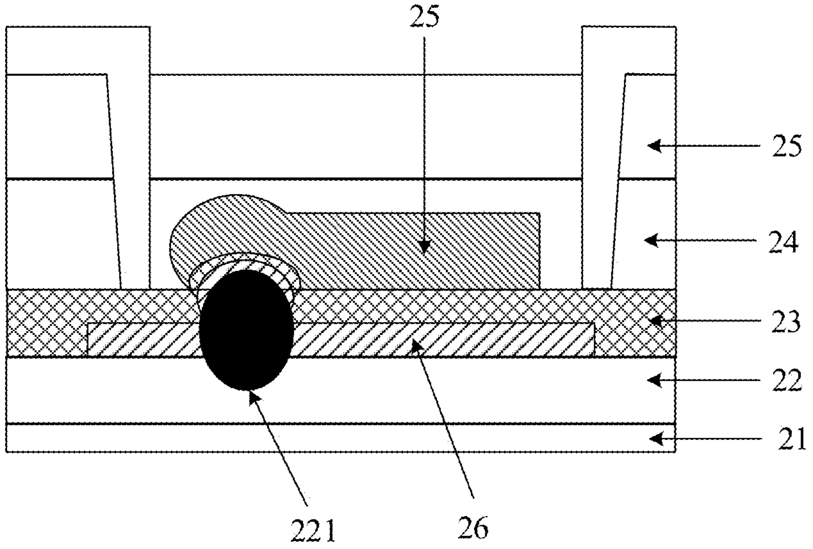
FIG. 3 is a schematic structural diagram of a sense transistor in the circuit structure shown in FIG. 1.
Figures 4, 5:
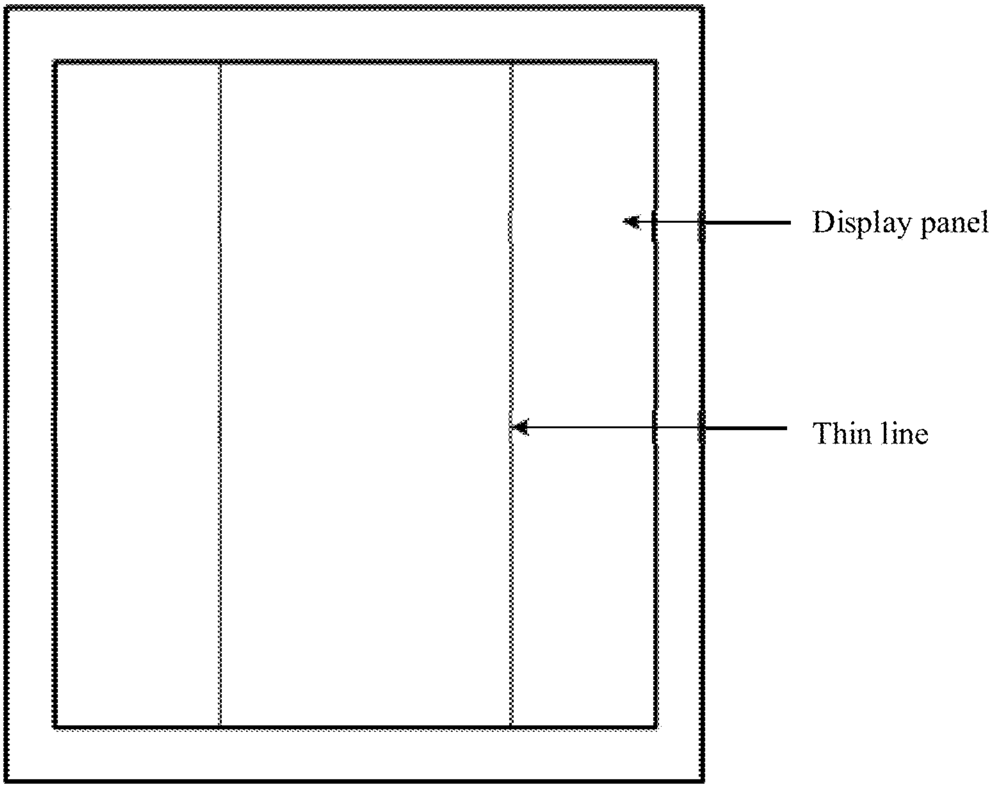
FIG. 4 is a schematic diagram of a display effect of a display panel.
FIG. 5 is a schematic diagram of sensing values of the display panel shown in FIG. 4.
Figures 6, 7:
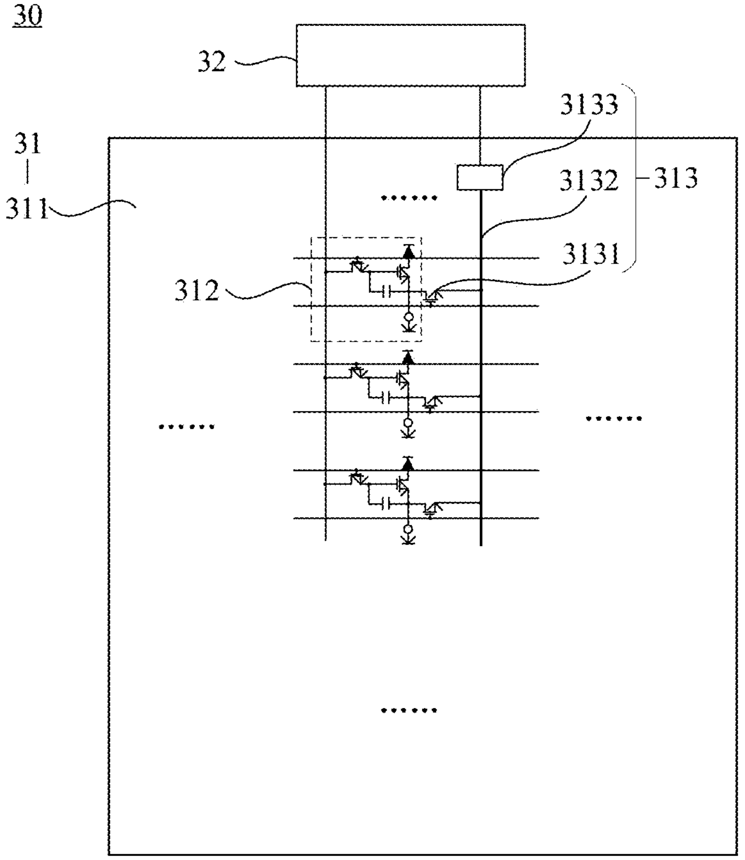
FIG. 6 is a schematic diagram of sensing values of another display panel.
FIG. 7 is a schematic structural diagram of a display device according to some embodiments of the present disclosure.

FIG. 3 is a schematic structural diagram of a sense transistor in the circuit structure shown in FIG. 1, FIG. 4 is a schematic diagram of a display effect of a display panel, FIG. 5 is a schematic diagram of sensing values of the display panel shown in FIG. 4, and FIG. 6 is a schematic diagram of sensing values of another display panel. Referring to FIG. 3, FIG. 4, FIG. 5, and FIG. 6, in the case that the sense transistor T2 in the pixel circuit or the sense signal line is slightly abnormal, the sensing value detected by the ADC is normal, and the value of the data voltage adjusted by ADC and input to the data signal terminal is normal, such that a precision of the outer compensation of the pixel circuit is less. As shown in FIG. 3, FIG. 3 shows a schematic structural diagram of a sense transistor of a display panel. The display panel includes a base substrate 21, a buffer layer 22, an active layer 26, a gate insulative layer 23, a gate 25, a first insulative layer 24, a second insulative layer 25, and a source and drain electrode of the sense transistor that are laminated. In manufacturing the display panel, in the case that the buffer layer is abnormal, for example, an abnormal bulge 221 is present on the buffer layer, and the active layer 26, the gate insulative layer 23, and the gate 25 are lifted by the abnormal bulge 221, such that the active layer 26 and the gate 25 are short, and the sense transistor is abnormal. The active layer is made of an indium gallium zinc oxide (IGZO).

The date shown in FIG. 5 is sensing values of pixel circuits of five columns of light-emitting units emitting the same color of light acquired by the ADC, and the sensing values are ADC values of the ADC. The sensing value in the third column is abnormal, and a weak thin line shown in FIG. 4 is displayed in the use of the display panel. Values shown in FIG. 6 are normal sensing values acquired by the ADC. It should be noted that data in FIG. 5 and FIG. 6 is the ADC value in the ADC, and the ADC value represents a voltage value or a current value. For example, 50 in FIG. 5 represents 0.588 V, in detail, 50/255*3 V=0.588 V. A reference voltage of the ADC is 3 V.

FIG. 7 is a schematic structural diagram of a display device according to some embodiments of the present disclosure. Referring to FIG. 7, the display device 30 includes a display panel 31 and a control assembly 32.

The display panel 31 includes a base substrate 311, and a plurality of first color light-emitting units 312 and a sensing unit 313 that are disposed on the base substrate 311. The plurality of first color light-emitting units 312 are all light-emitting units for emitting red light. The sensing unit 313 is electrically connected to the plurality of first color light-emitting units 312 to acquire a plurality of sensing values corresponding to the plurality of first color light-emitting units 312. The plurality of sensing values include a plurality of first sensing values and a plurality of second sensing values, the plurality of first sensing values are abnormal sensing values, the plurality of second sensing values are normal sensing values, and a plurality of first color light-emitting units 312 corresponding to the plurality of first sensing values are arranged successively.

The control assembly 32 is electrically connected to the sensing unit 313, and is configured to acquire a plurality of rearranged sensing values by rearranging the plurality of sensing values. First color light-emitting units 312 corresponding to at least some of the plurality of first sensing values in the plurality of rearranged sensing values are different from the first color light-emitting units 312 corresponding to the at least some of the plurality of first sensing values prior to the rearrangement. The control assembly 32 is electrically connected to the plurality of first color light-emitting units 312, and is configured to adjust the plurality of first color light-emitting units 312 in the display panel based on the plurality of rearranged sensing values.

In summary, a display device including a display panel and a control assembly is provided in the embodiments of the present disclosure. The corresponding relationship between the plurality of first color light-emitting units and the plurality of sensing values is adjusted by rearranging the plurality of sensing values in the display panel by a control assembly, such that first color light-emitting units corresponding to at least some of the plurality of first sensing values in the plurality of rearranged sensing values are different from the first color light-emitting units corresponding to the at least some of the plurality of first sensing values prior to the rearrangement, and the plurality of first color light-emitting units corresponding to the plurality of first sensing values are in a dispersed arrangement in the display panel. Thus, an obvious abnormal display of the display panel caused by the successive arrangement of the plurality of first color light-emitting units corresponding to the plurality of first sensing values is improved, an effect of the plurality of first sensing values on the display effect of the display panel is reduced, a poor display effect of the display panel in some practices is solved, and the display effect of the display panel in the display device is improved.

As shown in FIG. 7, optionally, the sensing unit 313 includes a plurality of sense transistors 3131, a plurality of sense lines 3132, and an analog-to-digital converter 3133, and the plurality of first color light-emitting units 312 in the display panel are arranged in rows and columns. The plurality of sense transistors 3131 are in one-to-one correspondence to the plurality of first color light-emitting units 312, and one of the plurality of sense lines 3132 is electrically connected to sense transistors 3131 corresponding to one column of the first color light-emitting units 312.

An input terminal of the analog-to-digital converter 3133 is connected to the one of the plurality of sense lines 3132, an output terminal of the analog-to-digital converter 3133 is electrically connected to the control assembly 33. The analog-to-digital converter (ADC) converts the voltage in the sense transistor 3131 acquired from the sense line 3132 to digital data (that is, the sensing value). The plurality of first sensing values input by the analog-to-digital converter to the control assembly include at least one column of the first sensing values. The one column of the first sensing values include a plurality of first sensing values. The plurality of second sensing values include a plurality of columns of second sensing values, and one column of sensing values in the plurality of columns of second sensing values includes a plurality of second sensing values.

In some embodiments, the control assembly is further configured to: determine K sensing values for exchange from the plurality of second sensing values in a target region of the display panel, K being a positive integer; and acquire the plurality of rearranged sensing values by mutually exchanging the K sensing values for exchange with K first sensing values. The first color light-emitting units corresponding to at least some of the first sensing values in the plurality of rearranged sensing values are different from the first color light-emitting units corresponding to at least some of the first sensing values prior to the rearrangement.

The plurality of first color light-emitting units in the target region are arranged in N columns and M rows, and N, M, and K are positive integers. The display panel includes at least one target region. In the case that the display panel includes one target region, the target region is a whole region of a display face of the display panel. In the case that the display panel includes a plurality of target regions, the plurality of target regions are not overlapped, and are arranged successively or in a dispersed arrangement in the display panel.

In some embodiments, the display panel includes a plurality of target regions, the plurality of first color light-emitting units corresponding to the plurality of first sensing values in each target region are arranged successively, and the sensing values for exchange in any target region are configured to exchange the first sensing values in the target region. That is, the sensing values for exchange configured to exchange the first sensing values and the corresponding first sensing values are in the same target region.

Illustratively, the target region includes five columns and one row, or five columns and four rows, and the target region is selected based on a dimension of the display panel and a density of light-emitting units in the display panel in the method.

Figure 8:
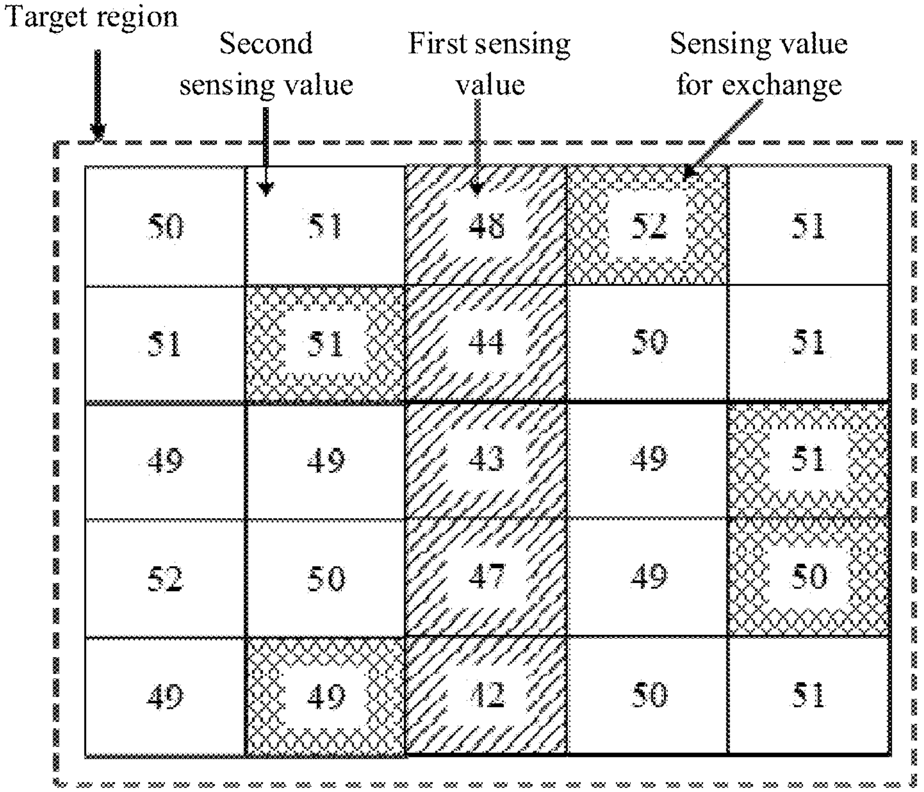
FIG. 8 is a schematic diagram of determination of sensing values for exchange according to some embodiments of the present disclosure.
Figure 9:
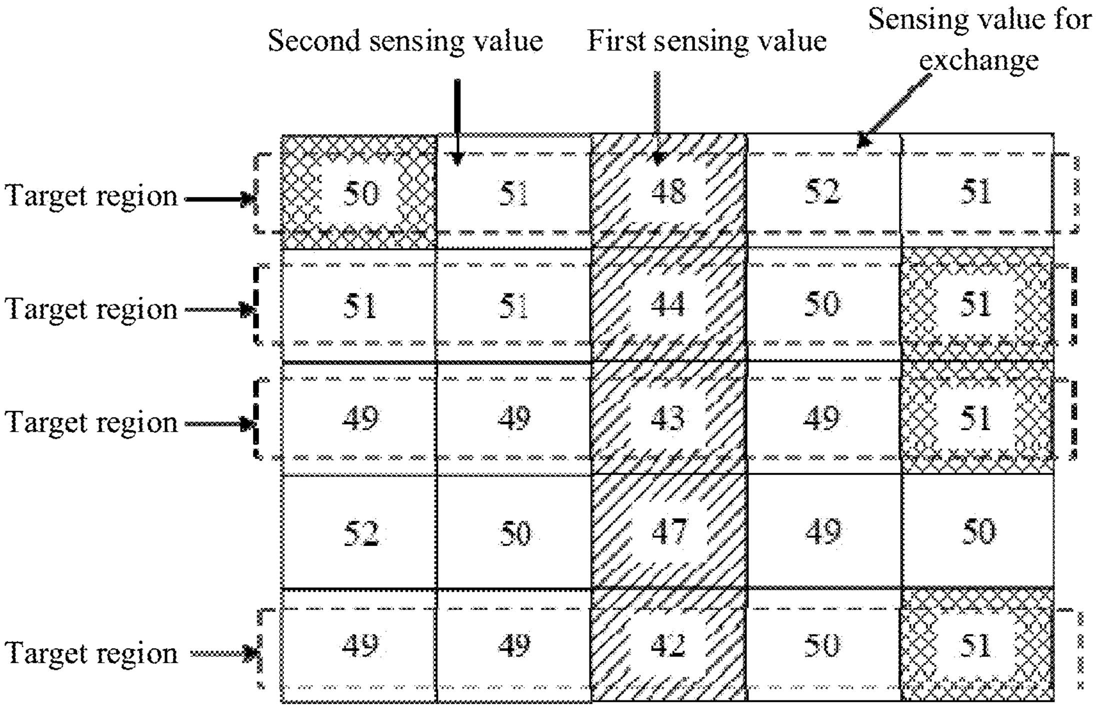
FIG. 9 is a schematic diagram of another determination of sensing values for exchange according to some embodiments of the present disclosure.

FIG. 8 is a schematic diagram of determination of sensing values for exchange according to some embodiments of the present disclosure, and FIG. 9 is a schematic diagram of another determination of sensing values for exchange according to some embodiments of the present disclosure. Referring to FIG. 8 and FIG. 9, K sensing values for exchange are randomly determined from the plurality of second sensing values in a target region of the display panel, and K is a number of the first sensing values in the target region. That is, a number of the sensing values for exchange in the target region is the number of the first sensing values in the target region.

Alternatively, K is a number less than the number of the first sensing values in the target region. That is, the number of the sensing values for exchange in the target region is less than the number of the first sensing values in the target region.

FIG. 8 shows a target region including five rows and five columns, and five sensing values in the third column "48, 44, 43, 47, and 42" are first sensing values. As such, five second sensing values are randomly determined from the plurality of second sensing values in the target region, and the five second sensing values are determined as the sensing values for exchange (52, 51, 51, 50, and 49).

Alternatively, four second sensing values are randomly determined from the plurality of second sensing values in the target region, and the four second sensing values are determined as the sensing values for exchange.

FIG. 9 shows a plurality of adjacent target regions, each target region includes one row and five columns, and a sensing value in the third column is a first sensing value. As such, a second sensing value is determined from other four second sensing values than the first sensing value in the row, and the second sensing value is determined as the sensing value for exchange.

It should be noted that as aging degrees of the light-emitting units in different regions in the display panel are different, an effect of the rearrangement of the plurality of sensing values on the display effect is reduced by disposing the target region and rearranging the plurality of sensing values in the target region. In the case that the uniformity of the display panel is great, the target region is a whole display region of the display panel.

In some embodiments, one first sensing value is defined in the target region, and the sensing value for exchange in the target region is a second sensing value with a minimum difference with the first sensing value in the target region, such that an effect of exchange of the first sensing value and the second sensing values on the display effect of the display panel is reduced.

Figure 10:
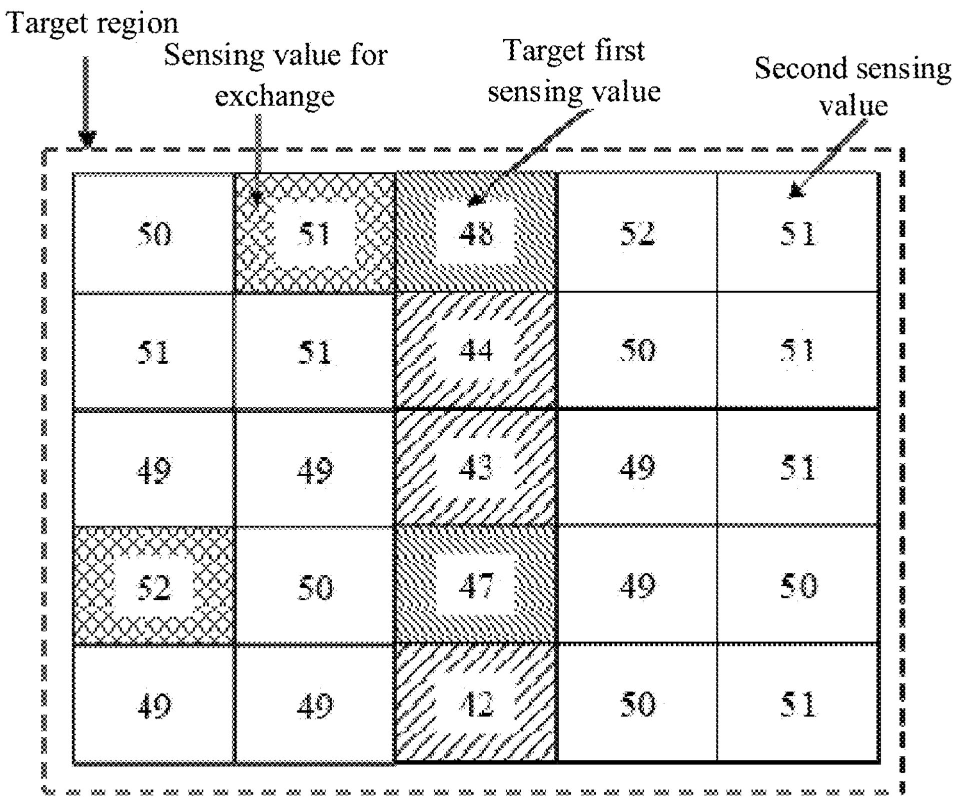
FIG. 10 is a schematic diagram of another determination of sensing values for exchange according to some embodiments of the present disclosure.
Figure 11:
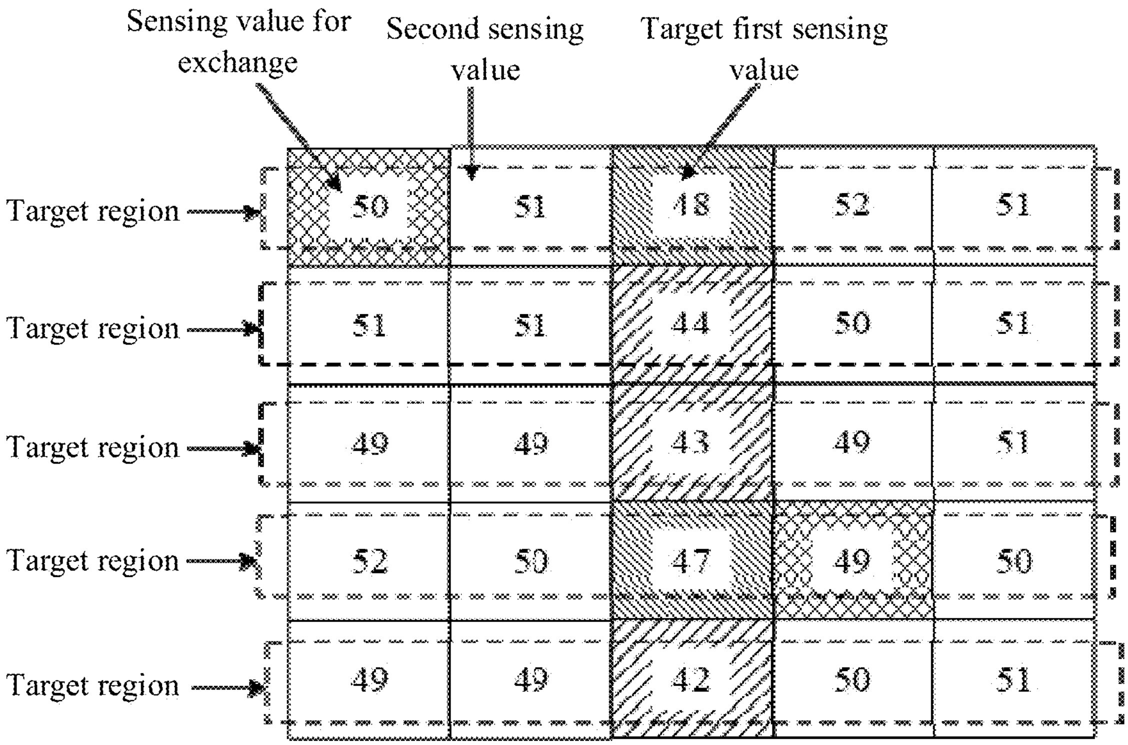
FIG. 11 is a schematic diagram of another determination of sensing values for exchange according to some embodiments of the present disclosure.

FIG. 10 is a schematic diagram of another determination of sensing values for exchange according to some embodiments of the present disclosure, and FIG. 11 is a schematic diagram of another determination of sensing values for exchange according to some embodiments of the present disclosure. In some embodiments, referring to FIG. 10 and FIG. 11, differences between target first sensing values in the plurality of first sensing values and a first average value are less than or equal to a first predetermined difference. The target first sensing values are first sensing values mutually exchanged with the K sensing values for exchange, and the first average value is an average value of two sensing values adjacent to any of the first sensing values in a row direction. That is, K sensing values for exchange are randomly determined from the plurality of second sensing values in the target region in the display panel, and K is the number of the target first sensing values in the target region. That is, the number of the sensing values for exchange in the target region is the number of the target first sensing values in the target region.

In some embodiments, a ratio of the first predetermined difference to the first average value ranges from 5% to 15%. Furthermore, the first predetermined difference is 10% of the first average value.

FIG. 10 shows a target region including five rows and five columns, and five sensing values in the third column are first sensing values. In the five sensing values "48, 44, 43, 47, and 42," "48 and 47" are target first sensing values, such that two second sensing values "51 and 52" are randomly determined from the plurality of second sensing values in the target region, and the two second sensing values are determined as the sensing values for exchange.

FIG. 11 shows a plurality of adjacent target regions, and each target region includes one row and five columns. Illustratively, in the case that the target first sensing value "48" is present in the target region, a second sensing value is randomly determined from a plurality of second sensing values in the row of the target first sensing value "48," and the second sensing value is determined as the sensing value for exchange.

In the case that no target first sensing value is present in the target region, the plurality of sensing values in the target region are not rearranged.

Figure 12:
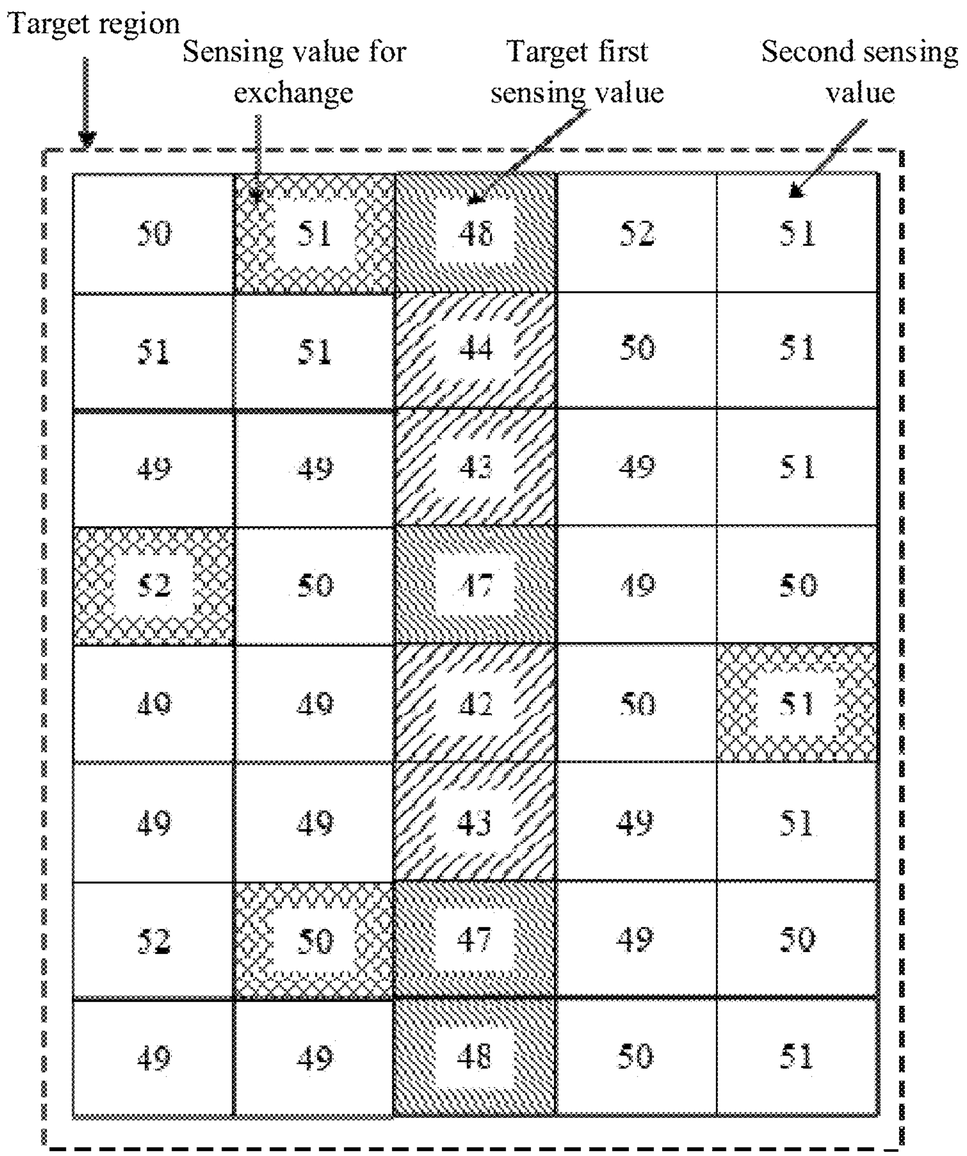
FIG. 12 is a schematic diagram of another determination of sensing values for exchange according to some embodiments of the present disclosure.

FIG. 12 is a schematic diagram of another determination of sensing values for exchange according to some embodiments of the present disclosure. Referring to FIG. 12, in some embodiments, the control assembly is further configured to: determine second sensing values in the same row as the target first sensing values in the target region as target second sensing values; and determine the K sensing values for exchange from a plurality of target second sensing values. That is, the sensing values for exchange are determined from the plurality of second sensing values in the same row as the target first sensing values.

Illustratively, the control assembly determines the second sensing values in the same row as the target first sensing values in the target region as the target second sensing values. As shown in FIG. 12, the target region includes five columns and eight rows, eight sensing values in the third column are the first sensing values, and in the eight sensing values "48, 44, 43, 47, 48, 43, 47, and 42," "48, 47, 48, and 47" are the target first sensing values, such that the plurality of second sensing values in the same row as the four target first sensing values are determined as the target second sensing values.

In addition, four second sensing value are randomly determined from the plurality of target second sensing values and determined as the sensing values for exchange “51, 52, 51, and 50.”

In some embodiments, one target first sensing value is defined in the target region, and the sensing value for exchange in the target region is a second sensing value with a minimum difference with the target first sensing value in the target region, such that an effect of exchange of the target first sensing value and the second sensing value on the display effect of the display panel is reduced.

Figure 13:
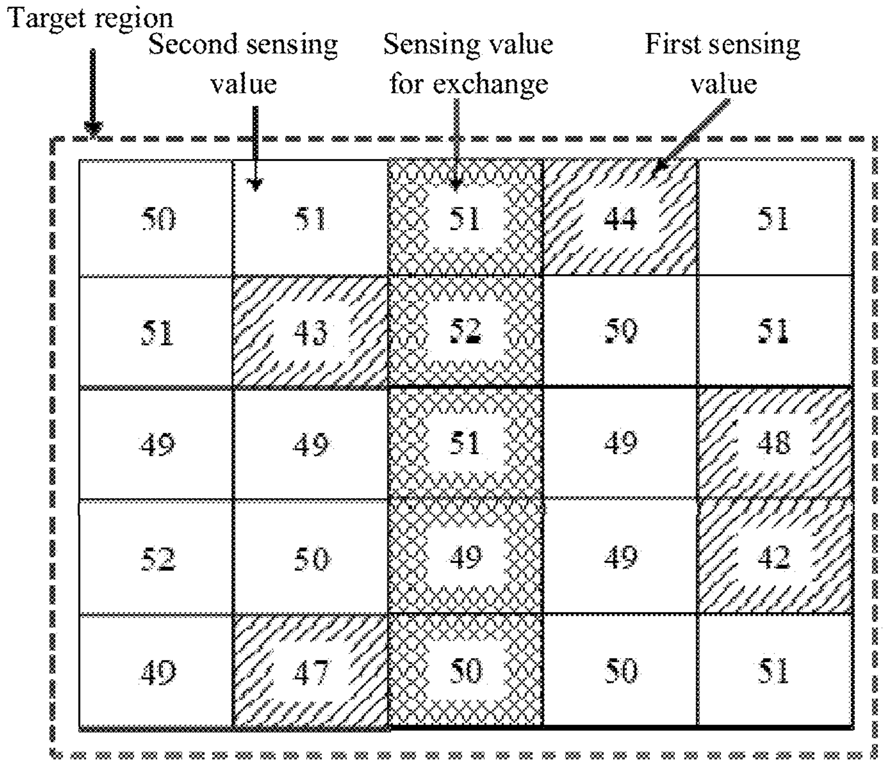
FIG. 13 is a schematic diagram of rearranged sensing values according to some embodiments of the present disclosure.
Figure 14:
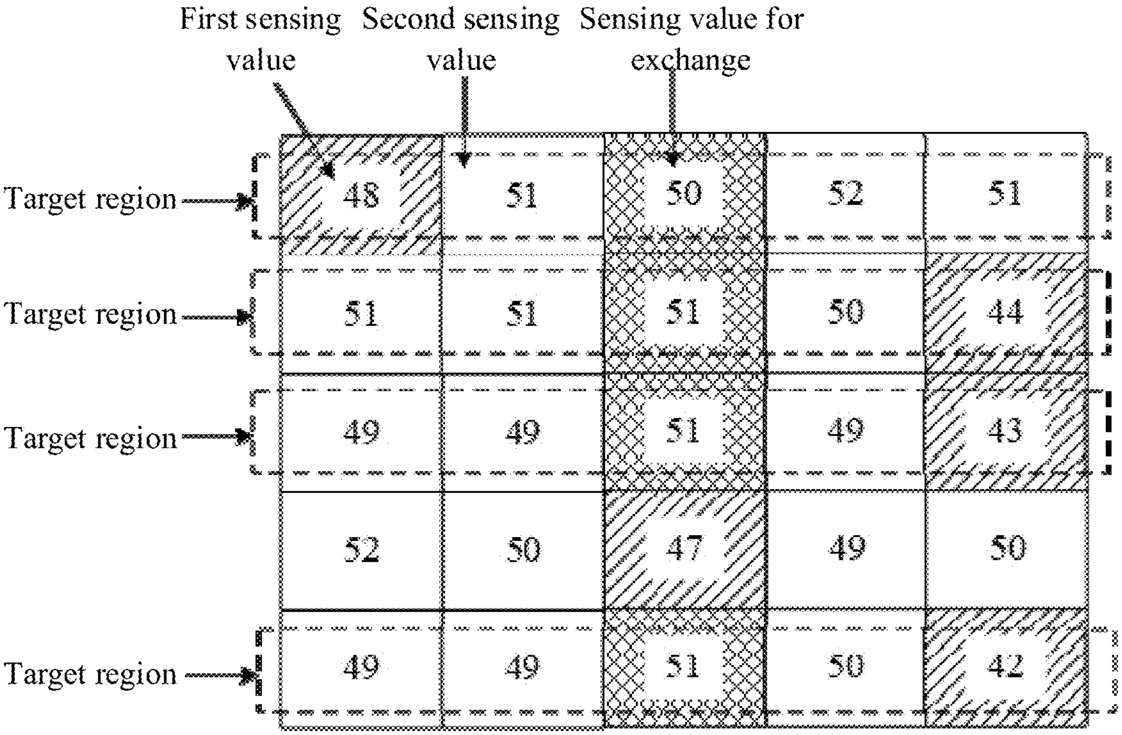
FIG. 14 is a schematic diagram of another rearranged sensing values according to some embodiments of the present disclosure.
Figure 15:
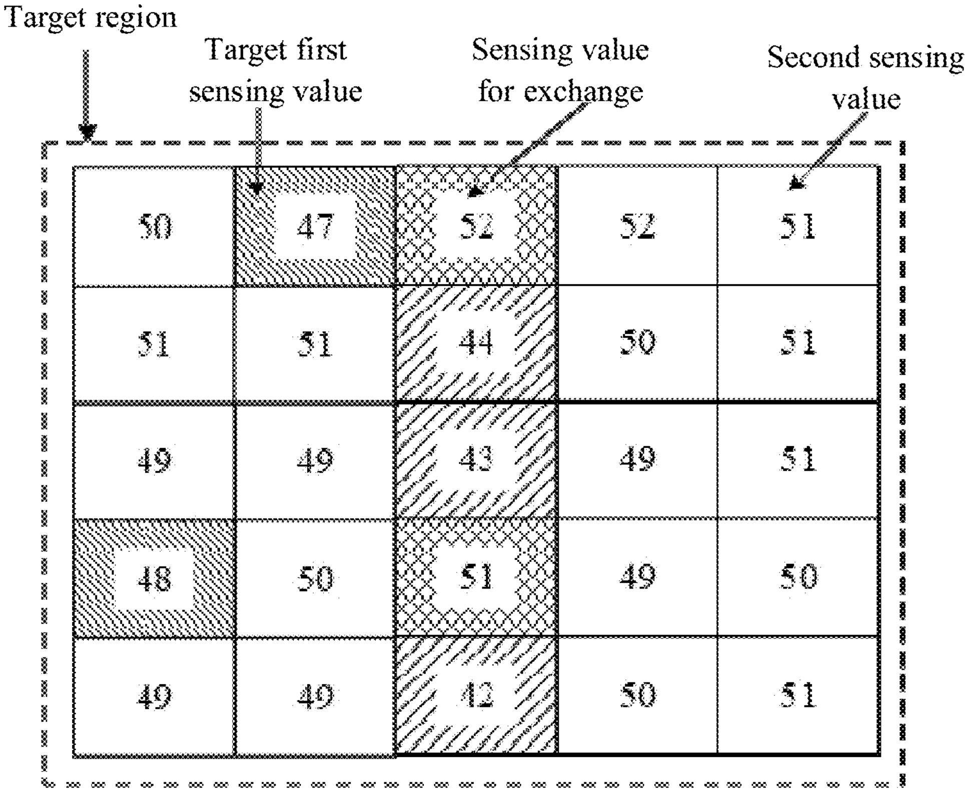
FIG. 15 is a schematic diagram of another rearranged sensing values according to some embodiments of the present disclosure.
Figure 16:
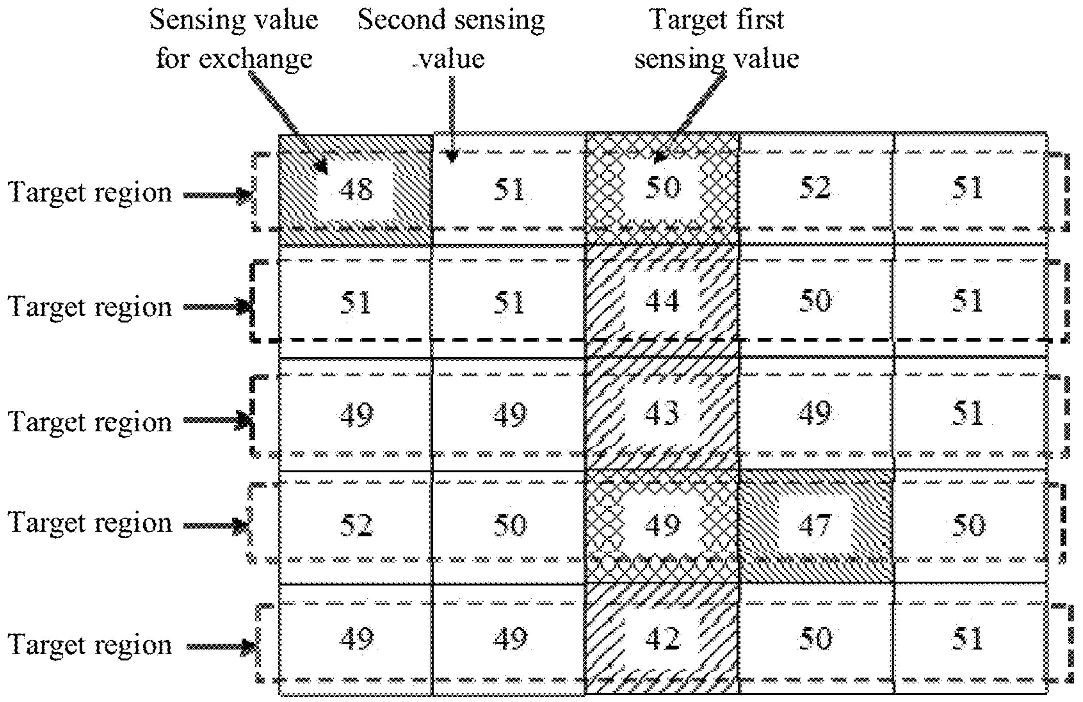
FIG. 16 is a schematic diagram of another rearranged sensing values according to some embodiments of the present disclosure.
Figure 17:
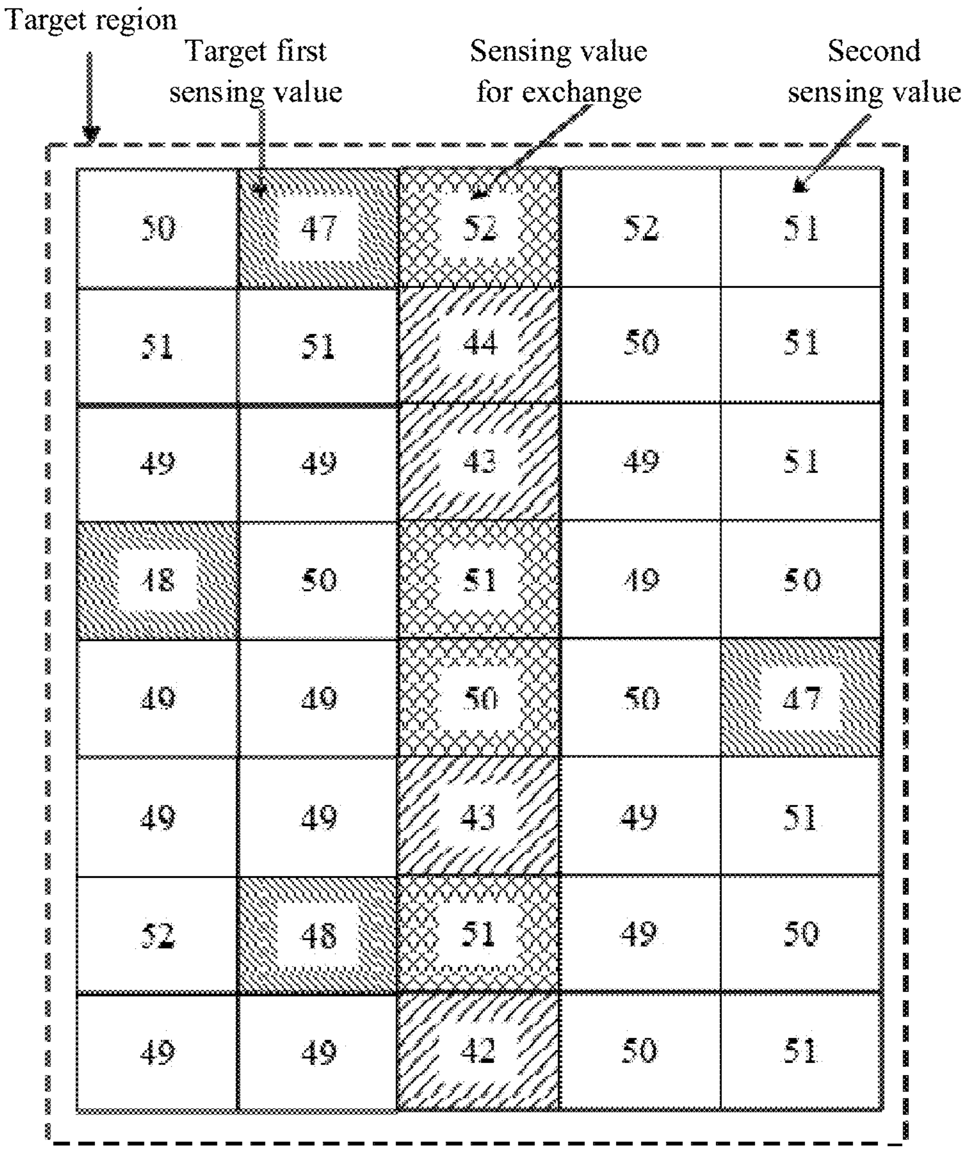
FIG. 17 is a schematic diagram of another rearranged sensing values according to some embodiments of the present disclosure.

FIG. 13 is a schematic diagram of rearranged sensing values according to some embodiments of the present disclosure, FIG. 14 is a schematic diagram of another rearranged sensing values according to some embodiments of the present disclosure, FIG. 15 is a schematic diagram of another rearranged sensing values according to some embodiments of the present disclosure, FIG. 16 is a schematic diagram of another rearranged sensing values according to some embodiments of the present disclosure, and FIG. 17 is a schematic diagram of another rearranged sensing values according to some embodiments of the present disclosure. Referring to FIG. 13, FIG. 14, FIG. 15, FIG. 16, and FIG. 17, FIG. 13 shows the plurality of rearranged sensing values corresponding to the embodiments shown in FIG. 8, FIG. 14 shows the plurality of rearranged sensing values corresponding to the embodiments shown in FIG. 9, FIG. 15 shows the plurality of rearranged sensing values corresponding to the embodiments shown in FIG. 10, FIG. 16 shows the plurality of rearranged sensing values corresponding to the embodiments shown in FIG. 11, and FIG. 17 shows the plurality of rearranged sensing values corresponding to the embodiments shown in FIG. 12.

Optionally, as shown in FIG. 15, FIG. 16, and FIG. 17, K first sensing values in the plurality of first sensing values exchanged with the K sensing values for exchange are the target first sensing values, such that the corresponding relationship between the plurality of first color light-emitting units and the plurality of sensing values is adjusted, and the plurality of first color light-emitting units corresponding to the plurality of abnormal sensing values are in the dispersed arrangement.

In some embodiments, the control assembly is further configured to acquire the plurality of rearranged sensing values by randomly rearranging the plurality of sensing values in each row in the display panel, such that the plurality of first color light-emitting units corresponding to the plurality of abnormal sensing values are in the dispersed arrangement, and the effect of the random rearrangement of the plurality of sensing values on the display effect of the display panel is reduced by randomly rearranging the plurality of sensing values in the same row.

In some embodiments, the control assembly is further configured to acquire the plurality of rearranged sensing values by randomly rearranging a plurality of first sensing values in one column of the first sensing values, such that the plurality of first color light-emitting units corresponding to the plurality of abnormal sensing values are in the dispersed arrangement, and the effect of the random rearrangement of the plurality of sensing values on the display effect of the display panel is reduced by randomly rearranging the plurality of sensing values in the same column.

In some embodiments, the control assembly is further configured to: determine any of the sensing values as the first sensing value in response to the sensing value being greater than or less than two sensing values adjacent to the sensing value in a row direction; and determine sensing values in the plurality of sensing values other than the first sensing value as the second sensing values. That is, the control assembly is further configured to determine whether any sensing value is the first sensing value based on differences between the any sensing value and a plurality of adjacent sensing values, and acquire the plurality of first sensing values and the plurality of second sensing values in the display panel.

Illustratively, the sensing unit acquires a plurality of sensing values corresponding to the plurality of first color light-emitting units. In sensing, the sense line inputs sensing voltages of the first color light-emitting units to the ADC, and the ADC converts the sensing voltages to digital data and outputs the sensing values of the first color light-emitting units.

In the case that any of the sensing values is greater than or less than two sensing values adjacent to the sensing value in the row direction, the control assembly determines the sensing value as the first sensing value, and determines sensing values in the plurality of sensing values other than the first sensing value as the second sensing values. In some embodiments, a number of the second sensing values is greater than a number of the first sensing values.

In some embodiments, the control assembly is further configured to: determine any of the sensing values as a target sensing value in response to the sensing value being greater than or less than two sensing values adjacent to the sensing value in a row direction; determine a plurality of sensing values in any column of the sensing values as the first sensing values in response to a ratio of a number of target sensing values in the any column of the sensing values in the display panel to a number of the column of the sensing values being greater than a predetermined ratio; and determine other columns of the sensing values than the column of the sensing values as the second sensing values. That is, in the case that a number of target sensing values in one column of the sensing values reaches a predetermined range, the sensing units (sense transistors or sense lines) corresponding to the one column of the sensing values are abnormal, and the plurality of sensing values in any column of the sensing values are determined as the first sensing values.

In some embodiments, the predetermined ratio ranges from 70% to 100%.

In some embodiments, the control assembly is further configured to: receive a display signal from a camera assembly, wherein the display signal is a plurality of luminance values corresponding to the plurality of first color light-emitting units in the display panel acquired by the camera assembly;

determine any of the first color light-emitting units as a target first color light-emitting unit in response to the luminance value of the first color light-emitting unit being greater than the luminance values of two first color light-emitting units adjacent to the sensing value in a row direction; determine a sensing value corresponding to the target first color light-emitting unit as a first sensing value; and determine sensing values in the plurality of sensing values other than the first sensing value as the second sensing values. The display screen of the display panel is acquired by the camera assembly. For example, the camera shots a display screen of a current frame of the display panel to acquire luminance values of the light-emitting units, and determines positions (for example, a position of the “thin line” in the display screen in FIG. 4) of light-emitting units corresponding to abnormal sensing values in an actual display screen of the display panel, such that the first sensing values in the plurality of sensing values are determined.

Illustratively, the display device includes a camera assembly. The camera assembly acquires the luminance values of the plurality of first color light-emitting units of the display panel, and is electrically connected to the control assembly. The camera assembly is an inner assembly of the display device. Alternatively, the camera assembly is an outer assembly of the display device, and the camera assembly is in wire or wireless connection to the control assembly.

Figure 18:
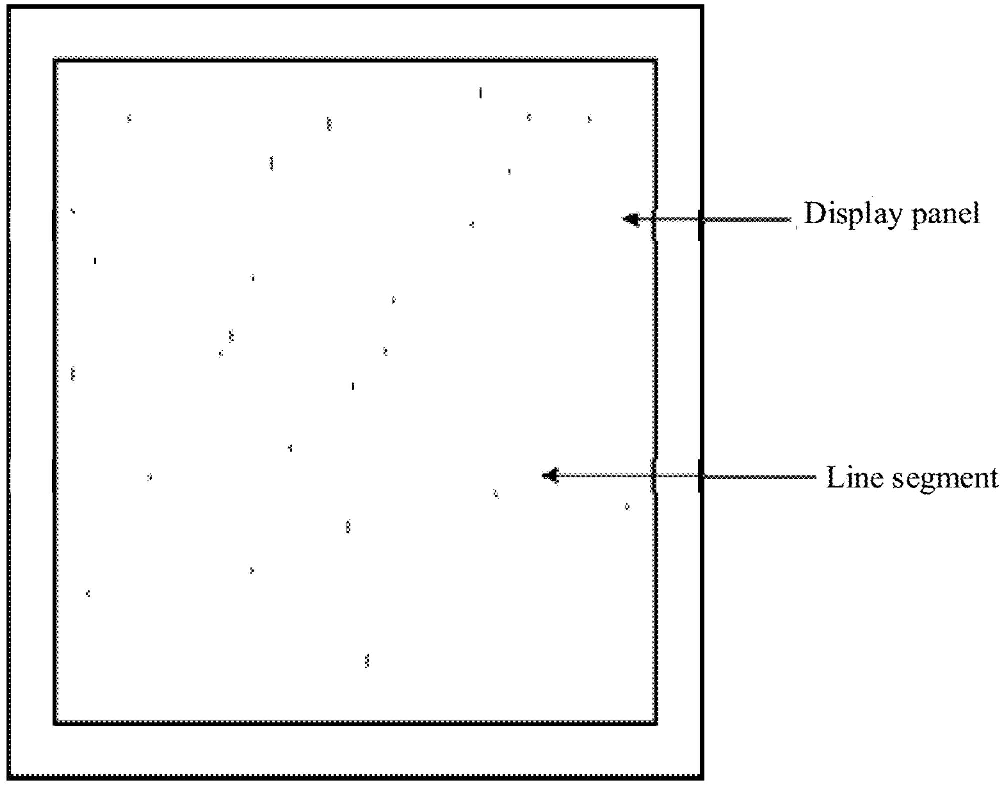
FIG. 18 is a schematic diagram of a display effect of a display panel according to some embodiments of the present disclosure.

FIG. 18 is a schematic diagram of a display effect of a display panel according to some embodiments of the present disclosure. Referring to FIG. 18, the control assembly adjusts the plurality of first color light-emitting units of the display panel based on the plurality of rearranged sensing values. That is, the control assembly performs the outer compensation (for example, the compensation of a threshold voltage of the drive transistor) on the pixel circuits based on the plurality of rearranged sensing values to alleviate the abnormal display of the display panel. Illustratively, the weak thin line in the display panel is changed to a plurality of shorter line segments or sputtered points, such that the human eyes are not prone to viewing the abnormal display of the display panel. It should be noted that for clear showing of the display effect of the display panel, FIG. 18 shows a plurality of line segments, and the plurality of line segments are short in the actual display screen of the display panel and not visible by the human eyes.

It should be noted that a filling pattern with the same color in the embodiments of the present disclosure in FIG. 8 to FIG. 17 represents the sensing values of the same type to distinguish the plurality of sensing values, and does not represent the actual display effect of the display panel.

In summary, a display device including a display panel and a control assembly is provided in the embodiments of the present disclosure. The corresponding relationship between the plurality of first color light-emitting units and the plurality of sensing values is adjusted by rearranging the plurality of sensing values in the display panel by a control assembly, such that first color light-emitting units corresponding to at least some of the plurality of first sensing values in the plurality of rearranged sensing values are different from the first color light-emitting units corresponding to the at least some of the plurality of first sensing values prior to the rearrangement, and the plurality of first color light-emitting units corresponding to the plurality of first sensing values are in a dispersed arrangement in the display panel. Thus, an obvious abnormal display of the display panel caused by the successive arrangement of the plurality of first color light-emitting units corresponding to the plurality of first sensing values is improved, an effect of the plurality of first sensing values on the display effect of the display panel is reduced, a poor display effect of the display panel in some practices is solved, and the display effect of the display panel in the display device is improved.

Figure 19:
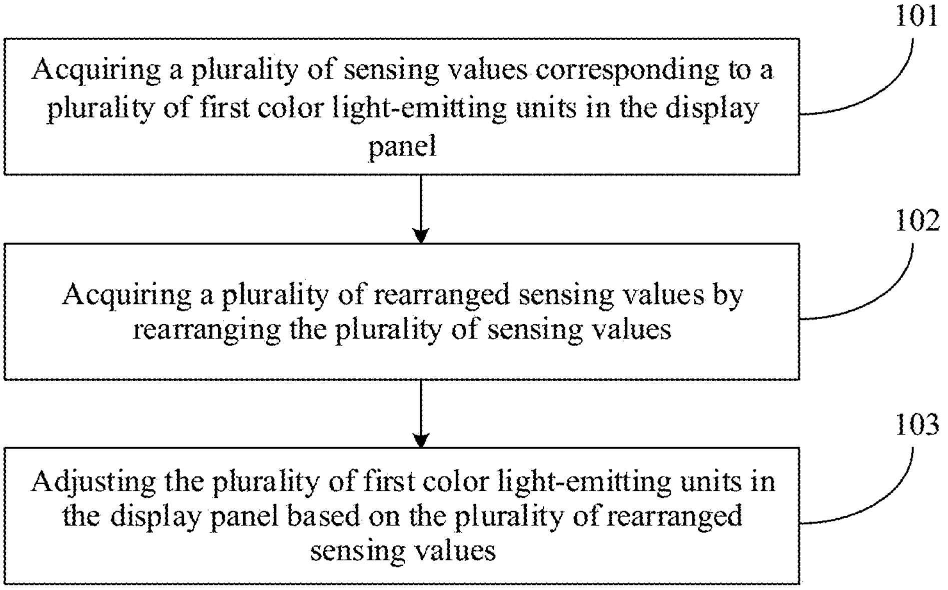
FIG. 19 is a flowchart of a method for adjusting a display device according to some embodiments of the present disclosure.

FIG. 19 is a flowchart of a method for adjusting a display device according to some embodiments of the present disclosure. The method is applicable to the display device, and the display device includes a display panel and a control assembly. The method includes the following processes.

In S101, a plurality of sensing values corresponding to a plurality of first color light-emitting units in the display panel are acquired.

The plurality of sensing values include a plurality of first sensing values and a plurality of second sensing values. The plurality of first sensing values are abnormal sensing values, the plurality of second sensing values are normal sensing values, and a plurality of first color light-emitting units corresponding to the plurality of first sensing values are arranged successively.

In S102, a plurality of rearranged sensing values are acquired by rearranging the plurality of sensing values.

First color light-emitting units corresponding to at least some of the plurality of first sensing values in the plurality of rearranged sensing values are different from the first color light-emitting units corresponding to the at least some of the plurality of first sensing values prior to the rearrangement.

In S103, the plurality of first color light-emitting units in the display panel are adjusted based on the plurality of rearranged sensing values.

In summary, a method for adjusting a display device is provided in the embodiments of the present disclosure. The corresponding relationship between the plurality of first color light-emitting units and the plurality of sensing values is adjusted by rearranging the plurality of sensing values in the display panel, such that first color light-emitting units corresponding to at least some of the plurality of first sensing values in the plurality of rearranged sensing values are different from the first color light-emitting units corresponding to the at least some of the plurality of first sensing values prior to the rearrangement, and the plurality of first color light-emitting units corresponding to the plurality of first sensing values are in a dispersed arrangement in the display panel. Thus, an obvious abnormal display of the display panel caused by the successive arrangement of the plurality of first color light-emitting units corresponding to the plurality of first sensing values is improved, an effect of the plurality of first sensing values on the display effect of the display panel is reduced, a poor display effect of the display panel in some practices is solved, and the display effect of the display panel in the display device is improved.

Figure 20:
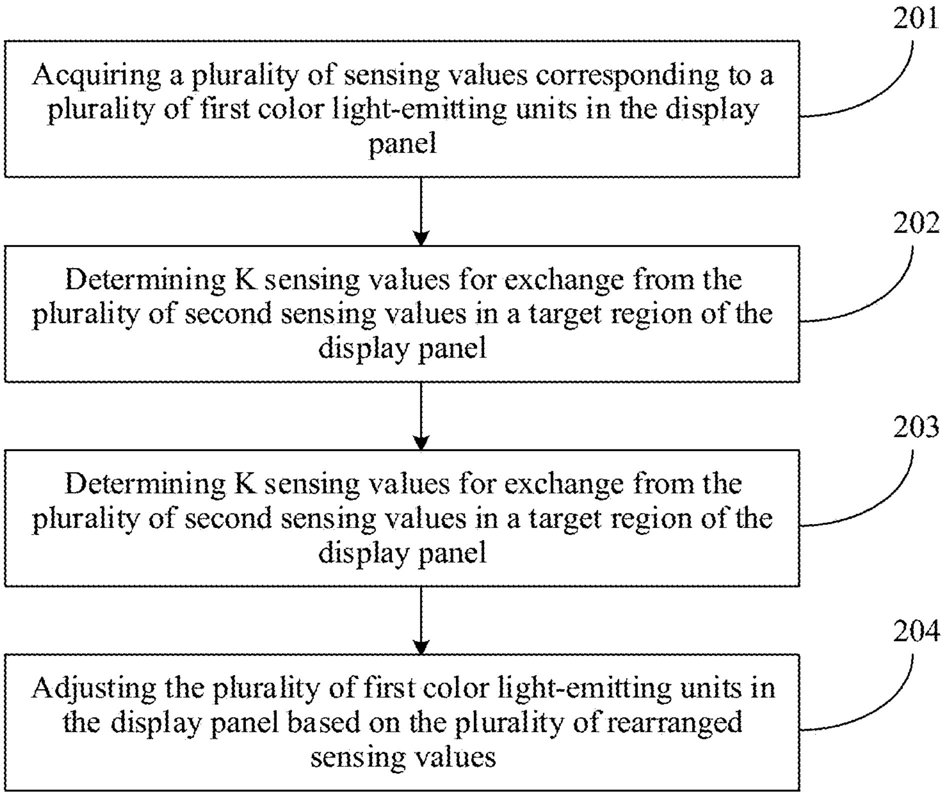
FIG. 20 is a flowchart of a method for adjusting a display device according to some embodiments of the present disclosure.

FIG. 20 is a flowchart of a method for adjusting a display device according to some embodiments of the present disclosure. The method is applicable to the display device, and the display device includes a display panel and a control assembly. The method includes the following processes.

In S201, a plurality of sensing values corresponding to a plurality of first color light-emitting units in the display panel are acquired.

The plurality of sensing values include a plurality of first sensing values and a plurality of second sensing values. The plurality of first sensing values are abnormal sensing values, the plurality of second sensing values are normal sensing values, and a plurality of first color light-emitting units corresponding to the plurality of first sensing values are arranged successively. The plurality of first color light-emitting units are light-emitting units in the display panel emitting the same color of light. For example, the plurality of first color light-emitting units are light-emitting units emitting the red light.

The plurality of first color light-emitting units in the display panel are arranged in rows and columns. The plurality of first sensing values include at least one column of the first sensing values, and the one column of the first sensing values include a plurality of first sensing values. The plurality of second sensing values include a plurality of columns of second sensing values, and one of the plurality of columns of second sensing values includes a plurality of second sensing values.

The method for acquiring the plurality of first sensing values and the plurality of second sensing values corresponding to the plurality of first color light-emitting units in the display panel includes the following three manners.

Figure 21:
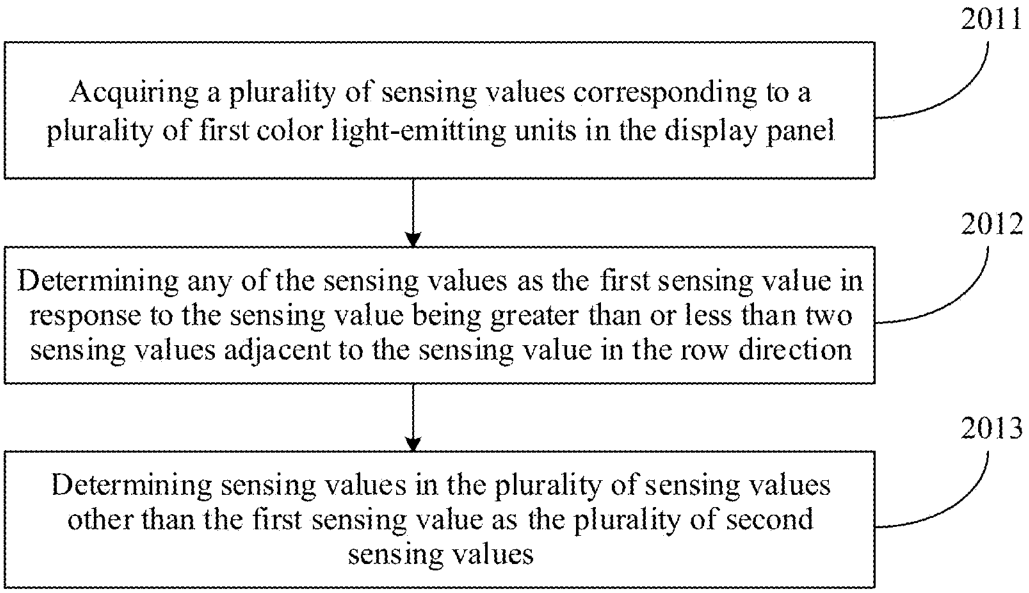
FIG. 21 is a flowchart of acquisition of a plurality of sensing values according to some embodiments of the present disclosure.

In a first manner, whether any sensing value is the first sensing value is determined based on differences between the any sensing value and a plurality of adjacent sensing values to acquire the plurality of first sensing values and the plurality of second sensing values in the display panel. As shown in FIG. 21, S201 includes the following three sub-processes.

In S2011, a plurality of sensing values corresponding to the plurality of first color light-emitting units in the display panel are acquired.

In some embodiments, the sensing unit acquires a plurality of sensing values corresponding to the plurality of first color light-emitting units. In sensing, the sense line inputs sensing voltages of the first color light-emitting units to the ADC, and the ADC converts the sensing voltages to digital data and outputs the sensing values of the first color light-emitting units.

In S2012, any of the sensing value is determined as the first sensing value in response to the sensing value being greater than or less than two sensing values adjacent to the sensing value in the row direction.

In some embodiments, any of the sensing values is compared with two sensing values adjacent to the sensing value in the row direction. In the case that the any of the sensing values is greater than two sensing values adjacent to the sensing value in the row direction, the sensing value is determined as the first sensing value. Alternatively, in the case that the any of the sensing values is less than two sensing values adjacent to the sensing value in the row direction, the sensing value is determined as the first sensing value. As shown in FIG. 5, 43 in FIG. 5 is less than two adjacent sensing value in the row direction, and 43 is determined as the first sensing value.

In S2013, sensing values in the plurality of sensing values other than the first sensing value are determined as the plurality of second sensing values.

In some embodiments, upon determination of the first sensing value in the plurality of sensing values, sensing values in the plurality of sensing values other than the first sensing value are determined as the second sensing values. In some embodiments, a number of the plurality of second sensing values is greater than a number of the plurality of first sensing values.

Figure 22:
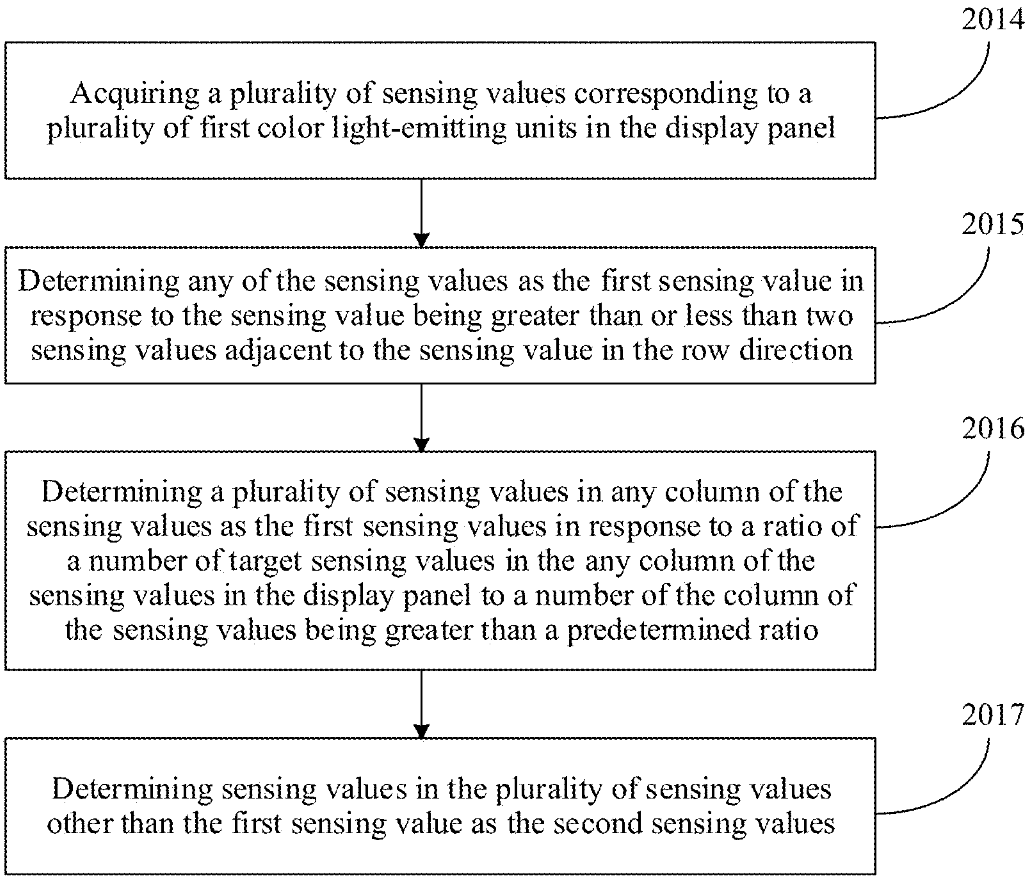
FIG. 22 is a flowchart of another acquisition of a plurality of sensing values according to some embodiments of the present disclosure.

In a second manner, a number of target sensing values in any column of the sensing values in the display panel is determined based on differences between any sensing value and a plurality of adjacent sensing values adjacent to the any sensing value, and the any column of the sensing values are determined as the first sensing values or the second sensing values to acquire the plurality of first sensing values and the plurality of second sensing values in the display panel. As shown in FIG. 22, S201 includes the following four sub-processes.

In S2014, a plurality of sensing values corresponding to the plurality of first color light-emitting units in the display panel are acquired.

The implementation of S2014 may be referred to as S2011, which is not repeated herein.

In S2015, any of the sensing values is determined as the first sensing value in response to the sensing value being greater than or less than two sensing values adjacent to the sensing value in the row direction.

The implementation of S2015 may be referred to as S2012, which is not repeated herein.

In S2016, a plurality of sensing values in any column of the sensing values are determined as the first sensing values in response to a ratio of a number of target sensing values in the any column of the sensing values in the display panel to a number of the column of the sensing values being greater than a predetermined ratio. The predetermined ratio ranges from 70% to 100%, for example, 80%.

That is, in the case that a number of target sensing values in one column of the sensing values reaches a predetermined range, the sensing units (sense transistors or sense lines) corresponding to the one column of the sensing values are abnormal, and the plurality of sensing values in any column of the sensing values are determined as the first sensing values.

In S2017, sensing values in the plurality of sensing values other than the first sensing value are determined as the plurality of second sensing values.

The implementation of S2017 may be referred to as S2013, which is not repeated herein.

Figure 23:
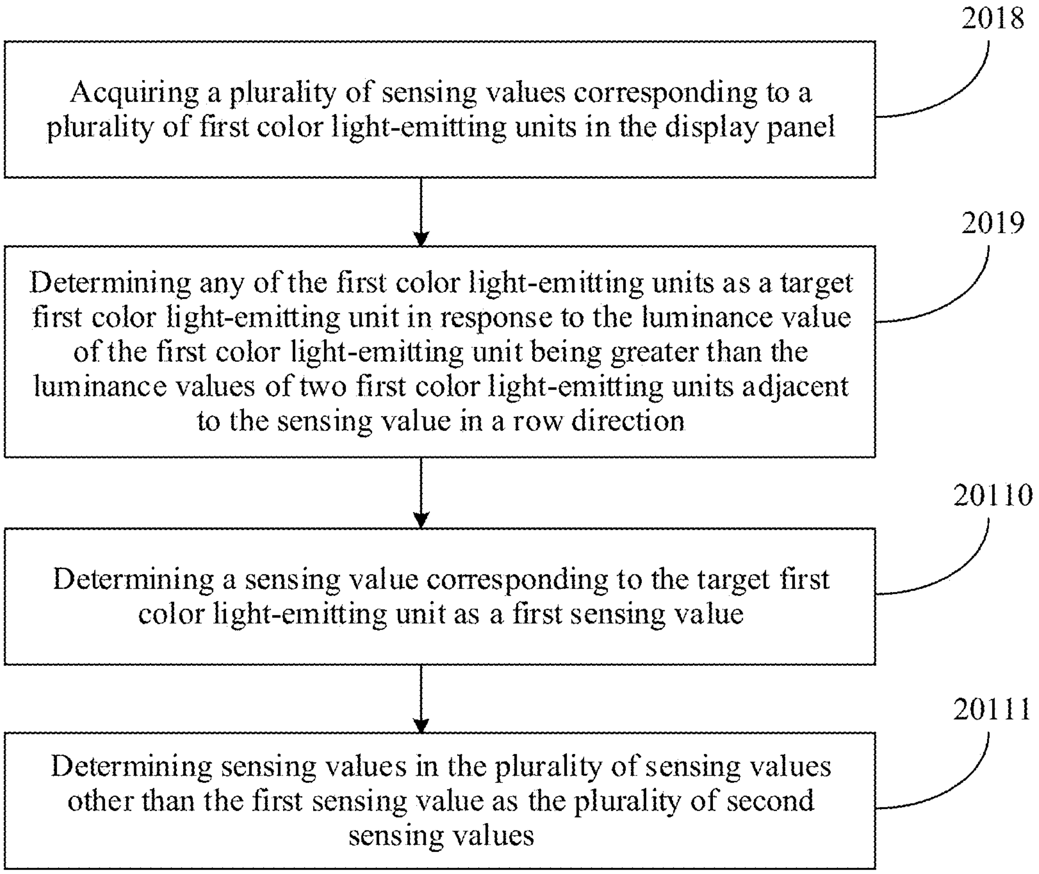
FIG. 23 is a flowchart of another acquisition of a plurality of sensing values according to some embodiments of the present disclosure.

In a third manner, the display screen of the display panel is acquired by the camera assembly. For example, the camera shots a display screen of a current frame of the display panel to acquire luminance values of the light-emitting units, and determines positions (for example, a position of the “thin line” in the display screen in FIG. 4) of light-emitting units corresponding to abnormal sensing values in an actual display screen of the display panel, such that the first sensing values in the plurality of sensing values are determined. As shown in FIG. 23, S201 includes the following four sub-processes.

In S2018, the plurality of luminance values and the plurality of sensing values of the plurality of first color light-emitting units of the display panel are acquired.

The display screen of the display panel is acquired by the camera assembly. For example, the camera shots a display screen of a current frame of the display panel to acquire luminance values of the light-emitting units. As luminance values of light-emitting units corresponding to abnormal sensing values are different from luminance values of light-emitting units corresponding to normal sensing values, positions of the abnormal light-emitting units are determined based on the luminance values of the light-emitting units.

The method for acquiring the plurality of sensing values may be referred to as the method for acquiring the plurality of sensing values in S2011.

In S2019, any of the first color light-emitting units is determined as a target first color light-emitting unit in response to the luminance value of the first color light-emitting unit being greater than the luminance values of two first color light-emitting units adjacent to the sensing value in a row direction.

As any light-emitting unit with the luminance value greater than the luminance values of other light-emitting units is prone to being viewed by the human eyes, any first color light-emitting unit with the luminance value greater than the plurality of first color light-emitting units adjacent to the any first color light-emitting unit is determined as the target first color light-emitting unit, and the light-emitting units with less luminance values are not determined as the target first color light-emitting units as the light-emitting units with less luminance values are not prone to being viewed by the human eyes.

In S20110, a sensing value corresponding to the target first color light-emitting unit is determined as a first sensing value.

As the plurality of first color light-emitting units and the plurality of sensing values are in one-to-one correspondence, the sensing values corresponding to the plurality of target first color light-emitting units are determined as the first sensing values.

In S20111, sensing values in the plurality of sensing values other than the first sensing value are determined as the second sensing values.

The implementation of S20111 may be referred to as S2013, which is not repeated herein.

In S202, K sensing values for exchange are determined from the plurality of second sensing values in a target region of the display panel.

The plurality of first color light-emitting units in the target region are arranged in N columns and M rows, and N, M, and K are positive integers. The display panel includes at least one target region. In the case that the display panel includes one target region, the target region is a whole region of a display face of the display panel. In the case that the display panel includes a plurality of target regions, the plurality of target regions are not overlapped and are arranged successively or in a dispersed arrangement in the display panel.

In some embodiments, the display panel includes a plurality of target regions, the plurality of first color light-emitting units corresponding to the plurality of first sensing values in each target region are arranged successively, and the sensing values for exchange in any target region are configured to exchange the first sensing values in the target region. That is, the sensing values for exchange configured to exchange the first sensing values and the corresponding first sensing values are in the same target region.

Illustratively, the target region includes five columns and one row, or five columns and four rows, and the target region is selected based on a dimension of the display panel and a density of light-emitting units in the display panel in the method.

Referring to FIG. 8 and FIG. 9, K sensing values for exchange are randomly determined from the plurality of second sensing values in a target region of the display panel, and K is a number of the first sensing values in the target region. That is, a number of the sensing values for exchange in the target region is the number of the first sensing values in the target region.

Alternatively, K is a number less than the number of the first sensing values in the target region. That is, the number of the sensing values for exchange in the target region is less than the number of the first sensing values in the target region.

FIG. 8 shows a target region including five rows and five columns, and five sensing values in the third column "48, 44, 43, 47, and 42" are first sensing values. As such, five second sensing values are randomly determined from the plurality of second sensing values in the target region, and the five second sensing values are determined as the sensing values for exchange (52, 51, 51, 50, and 49).

Alternatively, four second sensing values are randomly determined from the plurality of second sensing values in the target region, and the four second sensing values are determined as the sensing values for exchange.

FIG. 9 shows a plurality of adjacent target regions, each target region includes one row and five columns, and a sensing value in the third column is a first sensing value. As such, a second sensing value is determined from other four second sensing values than the first sensing value in the row, and the second sensing value is determined as the sensing value for exchange.

It should be noted that as aging degrees of the light-emitting units in different regions in the display panel are different, an effect of the rearrangement of the plurality of sensing values on the display effect is reduced by disposing the target region and rearranging the plurality of sensing values in the target region. In the case that the uniformity of the display panel is great, the target region is a whole display region of the display panel.

In some embodiments, one first sensing value is defined in the target region, and the sensing value for exchange in the target region is a second sensing value with a minimum difference with the first sensing value in the target region, such that an effect of exchange of the first sensing value and the second sensing values on the display effect of the display panel is reduced.

Referring to FIG. 10 and FIG. 11, in some embodiments, K sensing values for exchange are randomly determined from the plurality of second sensing values in the target region in the display panel, and K is the number of the target first sensing values in the target region. That is, the number of the sensing values for exchange in the target region is the number of the target first sensing values in the target region.

Differences between target first sensing values in the plurality of first sensing values and a first average value are less than or equal to a first predetermined difference. The target first sensing values are first sensing values mutually exchanged with the K sensing values for exchange, and the first average value is an average value of two sensing values adjacent to any of the first sensing values in a row direction.

In some embodiments, a ratio of the first predetermined difference to the first average value ranges from 5% to 15%. Furthermore, the first predetermined difference is 10% of the first average value.

FIG. 10 shows a target region including five rows and five columns, and five sensing values in the third column are first sensing values. In the five sensing values "48, 44, 43, 47, and 42," "48 and 47" are target first sensing values, such that two second sensing values "51 and 52" are randomly determined from the plurality of second sensing values in the target region, and the two second sensing values are determined as the sensing values for exchange.

FIG. 11 shows a plurality of adjacent target regions, and each target region includes one row and five columns. Illustratively, in the case that the target first sensing value "48" is present in the target region, a second sensing value is randomly determined from a plurality of second sensing values in the row of the target first sensing value "48," and the second sensing value is determined as the sensing value for exchange.

In the case that no target first sensing value is present in the target region, the plurality of sensing values in the target region are not rearranged.

Referring to FIG. 12, in some embodiments, the sensing values for exchange are determined from the plurality of second sensing values in the same row as the target first sensing values, and S202 includes the following sub-processes.

(1) The second sensing values in the same row as the target first sensing values in the target region are determined as the target second sensing values. As shown in FIG. 16, the target region includes five columns and eight rows, eight sensing values in the third column are the first sensing values, and in the eight sensing values "48, 44, 43, 47, 48, 43, 47, and 42," "48, 47, 48, and 47" are the target first sensing values, such that the plurality of second sensing values in the same row as the four target first sensing values are determined as the target second sensing values.

(2) K sensing values for exchange are determined from the plurality of target second sensing values.

In addition, four second sensing value are randomly determined from the plurality of target second sensing values and determined as the sensing values for exchange "51, 52, 51, and 50."

In some embodiments, one target first sensing value is defined in the target region, and the sensing value for exchange in the target region is a second sensing value with a minimum difference with the target first sensing value in the target region, such that an effect of exchange of the target first sensing value and the second sensing value on the display effect of the display panel is reduced.

In S203, the plurality of rearranged sensing values are acquired by mutually exchanging the K sensing values for exchange with K first sensing values.

The first color light-emitting units corresponding to at least some of the first sensing values in the plurality of rearranged sensing values are different from the first color light-emitting units corresponding to at least some of the first sensing values prior to the rearrangement.

Referring to FIG. 13, FIG. 14, FIG. 15, FIG. 16, and FIG. 17, FIG. 13 shows the plurality of rearranged sensing values corresponding to the embodiments shown in FIG. 8, FIG. 14 shows the plurality of rearranged sensing values corresponding to the embodiments shown in FIG. 9, FIG. 15 shows the plurality of rearranged sensing values corresponding to the embodiments shown in FIG. 10, FIG. 16 shows the plurality of rearranged sensing values corresponding to the embodiments shown in FIG. 11, and FIG. 17 shows the plurality of rearranged sensing values corresponding to the embodiments shown in FIG. 12.

Optionally, as shown in FIG. 15, FIG. 16, and FIG. 17, K first sensing values in the plurality of first sensing values exchanged with the K sensing values for exchange are the target first sensing values, such that the corresponding relationship between the plurality of first color light-emitting units and the plurality of sensing values is adjusted, and the plurality of first color light-emitting units corresponding to the plurality of abnormal sensing values are in the dispersed arrangement.

In some embodiments, the plurality of rearranged sensing values are acquired by randomly rearranging the plurality of sensing values in each row in the display panel, such that the plurality of first color light-emitting units corresponding to the plurality of abnormal sensing values are in the dispersed arrangement, and the effect of the random rearrangement of the plurality of sensing values on the display effect of the display panel is reduced by randomly rearranging the plurality of sensing values in the same row.

In some embodiments, the plurality of rearranged sensing values are acquired by randomly rearranging a plurality of first sensing values in one column of the first sensing values, such that the plurality of first color light-emitting units corresponding to the plurality of abnormal sensing values are in the dispersed arrangement, and the effect of the random rearrangement of the plurality of sensing values on the display effect of the display panel is reduced by randomly rearranging the plurality of sensing values in the same column.

In S204, the plurality of first color light-emitting units of the display panel are adjusted based on the plurality of rearranged sensing values.

The outer compensation (for example, the compensation of a threshold voltage of the drive transistor) is performed on the pixel circuits based on the plurality of rearranged sensing values to alleviate the abnormal display of the display panel. FIG. 18 is a schematic diagram of a display effect of a display panel according to some embodiments of the present disclosure. Illustratively, the weak thin line in the display panel is changed to a plurality of shorter line segments or sputtered points, such that the human eyes are not prone to viewing the abnormal display of the display panel. It should be noted that for clear showing of the display effect of the display panel, FIG. 18 shows a plurality of line segments, and the plurality of line segments are short in the actual display screen of the display panel and not visible by the human eyes.

In summary, a method for adjusting a display device is provided in the embodiments of the present disclosure. The corresponding relationship between the plurality of first color light-emitting units and the plurality of sensing values is adjusted by rearranging the plurality of sensing values in the display panel, such that first color light-emitting units corresponding to at least some of the plurality of first sensing values in the plurality of rearranged sensing values are different from the first color light-emitting units corresponding to the at least some of the plurality of first sensing values prior to the rearrangement, and the plurality of first color light-emitting units corresponding to the plurality of first sensing values are in a dispersed arrangement in the display panel. Thus, an obvious abnormal display of the display panel caused by the successive arrangement of the plurality of first color light-emitting units corresponding to the plurality of first sensing values is improved, an effect of the plurality of first sensing values on the display effect of the display panel is reduced, a poor display effect of the display panel in some practices is solved, and the display effect of the display panel in the display device is improved.

Figure 24:
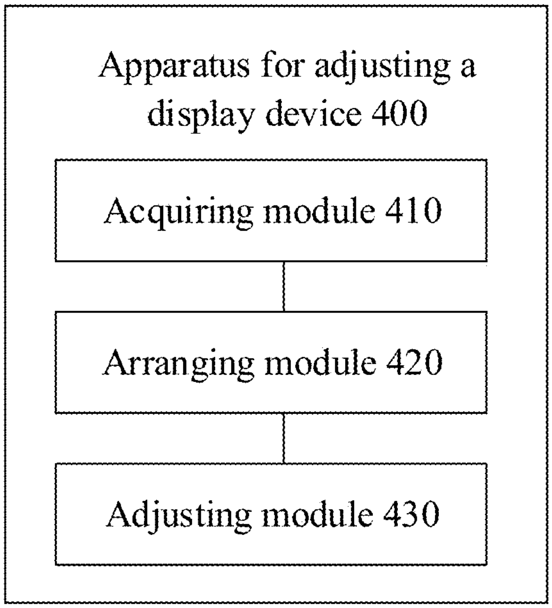
FIG. 24 is a schematic structural diagram of an apparatus for adjusting a display device according to some embodiments of the present disclosure.

FIG. 24 is a schematic structural diagram of an apparatus for adjusting a display device according to some embodiments of the present disclosure. Referring to FIG. 24, the apparatus 400 for adjusting the display device includes:

an acquiring module 410, configured to acquire a plurality of sensing values corresponding to a plurality of first color light-emitting units in the display panel, wherein the plurality of sensing values include a plurality of first sensing values and a plurality of second sensing values, the plurality of first sensing values being abnormal sensing values, the plurality of second sensing values being normal sensing values, and a plurality of first color light-emitting units corresponding to the plurality of first sensing values being arranged successively;

an arranging module 420, configured to acquire a plurality of rearranged sensing values by rearranging the plurality of sensing values, wherein first color light-emitting units corresponding to at least some of the plurality of first sensing values in the plurality of rearranged sensing values are different from the first color light-emitting units corresponding to the at least some of the plurality of first sensing values prior to rearrangement; and an adjusting module 430, configured to adjust the plurality of first color light-emitting units in the display panel based on the plurality of rearranged sensing values.

Embodiments of the present disclosure further provide a device for adjusting a display device. The device for adjusting the display device includes a processor and a memory storing at least one instruction, at least one program, a code set, and an instruction set, wherein the processor, when loading and executing the at least one instruction, the at least one program, the code set, and the instruction set, is caused to perform the method for adjusting the display device in any of the above embodiments.

Embodiments of the present disclosure further provide a computer storage medium. The computer storage medium stores at least one instruction, at least one program, a code set, and an instruction set, wherein the at least one instruction, the at least one program, the code set, and the instruction set, when loaded and executed by a processor, cause the processor to perform the method for adjusting the display device in any of the above embodiments.

Embodiments of the present disclosure further provide a computer program product or a computer program. The computer program product or a computer program includes computer instructions stored in a computer-readable storage medium. A processor of the computer device reads the computer instructions from the computer-readable storage medium. The processor, when loading and executing the computer instructions, is caused to perform the method for adjusting the display device in any of the above embodiments.

In the present disclosure, the terms "first," "second," "third," "fourth," and the like are only used for the purpose of description and should not be construed as indicating or implying relative importance or implicitly indicating the number of technical features as indicated. Unless otherwise clearly defined, the expression "a plurality of" refers to two or more.

In the embodiments of the present disclosure, it should be noted that the device and method may be achieved in other manners. For example, the above embodiments of the device are merely illustrative. For example, the division of the units are the division based on logical functions, and other divisions may be performed in actual implementation. For example, a plurality of units or assemblies are integrated on another system, or some features are omitted or not performed. In addition, the coupling, the direct coupling, or the communication connection displayed or described in the above description are achieved by interfaces, and the indirect coupling or communication connection between the devices or units are electrical, mechanical, or in other manners.

The units described as separated members are or are not separated physically. The members displayed as the units are or are not physical units, that is, are in a same position or disposed on a grid unit. Some or all units are selected to achieved the technical effects of the embodiments of the present disclosure based on actual needs.

Persons of ordinary skill in the art should understand that some or all of the processes in the above embodiments can be achieved by the hardware or by the hardware instructed by the programs. The programs are stored in a computer-readable storage medium, and the above storage medium are a read only memory, a disk, or an optical disc.

Described above are example embodiments of the present disclosure, and are not intended to limit the present disclosure. Any modifications, equivalent replacements, improvements and the like made within the spirit and principles of the present disclosure should be included within the scope of protection of the present disclosure.

The invention claimed is:

1. A display device, comprising: a display panel and a control assembly; wherein the display panel comprises a base substrate, and a plurality of first color light-emitting units and a sensing unit that are disposed on the base substrate, wherein the sensing unit is electrically connected to the plurality of first color light-emitting units to acquire a plurality of sensing values corresponding to the plurality of first color light-emitting units, wherein the plurality of sensing values comprise a plurality of first sensing values and a plurality of second sensing values, the plurality of first sensing values being abnormal sensing values, the plurality of second sensing values being normal sensing values, and a plurality of first color light-emitting units corresponding to the plurality of first sensing values being arranged successively;

the control assembly is electrically connected to the sensing unit, and configured to acquire a plurality of rearranged sensing values by rearranging the plurality of sensing values, wherein first color light-emitting units corresponding to at least some of the plurality of first sensing values in the plurality of rearranged sensing values are different from the first color light-emitting units corresponding to the at least some of the plurality of first sensing values prior to rearrangement; and the control assembly is further configured to adjust the plurality of first color light-emitting units in the display panel based on the plurality of rearranged sensing values.

2. The display device according to claim 1, wherein the sensing unit comprises a plurality of sense transistors, a plurality of sense lines, and an analog-to-digital converter, and the plurality of first color light-emitting units in the display panel are arranged in rows and columns;

wherein the plurality of sense transistors are in one-to-one correspondence to the plurality of first color light-emitting units, one of the plurality of sense lines is electrically connected to sense transistors corresponding to one column of the first color light-emitting units, an input terminal of the analog-to-digital converter is connected to the one of the plurality of sense lines, an output terminal of the analog-to-digital converter is electrically connected to the control assembly, and the plurality of first sensing values input by the analog-to-digital converter to the control assembly comprise at least one column of the first sensing values.

3. The display device according to claim 2, wherein the control assembly is further configured to acquire the plurality of rearranged sensing values by randomly rearranging the plurality of sensing values in each row in the display panel.

4. The display device according to claim 2, wherein the control assembly is further configured to acquire the plurality of rearranged sensing values by randomly rearranging a plurality of first sensing values in one column of the first sensing values.

5. The display device according to claim 2, wherein the control assembly is further configured to:

determine any of the sensing values as the first sensing value in response to the sensing value being greater than or less than two sensing values adjacent to the sensing value in a row direction; and determine sensing values in the plurality of sensing values other than the first sensing value as the plurality of second sensing values.

6. The display device according to claim 2, wherein the control assembly is further configured to:

determine any of the sensing values as a target sensing value in response to the sensing value being greater than or less than two sensing values adjacent to the sensing value in a row direction;

determine a plurality of sensing values in any column of the sensing values as the first sensing values in response to a ratio of a number of target sensing values in the any column of the sensing values in the display panel to a number of the column of the sensing values being greater than a predetermined ratio; and determine other columns of the sensing values than the column of the sensing values as the second sensing values.

7. The display device according to claim 6, wherein the predetermined ratio ranges from 70% to 100%.

8. The display device according to claim 2, wherein the control assembly is further configured to:

receive a display signal from a camera assembly, wherein the display signal is a plurality of luminance values corresponding to the plurality of first color light-emitting units in the display panel acquired by the camera assembly;

determine any of the first color light-emitting units as a target first color light-emitting unit in response to the luminance value of the first color light-emitting unit being greater than the luminance values of two first color light-emitting units adjacent to the sensing value in a row direction;

determine a sensing value corresponding to the target first color light-emitting unit as a first sensing value; and determine sensing values in the plurality of sensing values other than the first sensing value as the second sensing values.

9. The display device according to claim 1, wherein the control assembly is further configured to:

determine K sensing values for exchange from the plurality of second sensing values in a target region of the display panel, K being a positive integer; and acquire the plurality of rearranged sensing values by mutually exchanging the K sensing values for exchange with K first sensing values.

10. The display device according to claim 9, wherein one first sensing value is defined in the target region, and the sensing value for exchange in the target region is a second sensing value with a minimum difference with the first sensing value in the target region.

11. The display device according to claim 1, wherein differences between target first sensing values in the plurality of first sensing values and a first average value are less than or equal to a first predetermined difference, wherein the target first sensing values are first sensing values mutually exchanged with K sensing values for exchange, and the first average value is an average value of two sensing values adjacent to any of the plurality of first sensing values in a row direction.

12. The display device according to claim 11, wherein a ratio of the first predetermined difference to the first average value ranges from 5% to 15%.

13. The display device according to claim 11, wherein the control assembly is further configured to:

determine second sensing values in the same row as the target first sensing values in the target region as target second sensing values; and determine the K sensing values for exchange from a plurality of target second sensing values.

14. The display device according to claim 11, wherein one target first sensing value is defined in the target region, and the sensing value for exchange in the target region is a second sensing value with a minimum difference with the target first sensing value in the target region.

15. A method for adjusting a display device, applicable to the display device comprising a display panel and a control assembly, the method comprising:

acquiring a plurality of sensing values corresponding to a plurality of first color light-emitting units in the display panel, wherein the plurality of sensing values comprise a plurality of first sensing values and a plurality of second sensing values, the plurality of first sensing values being abnormal sensing values, the plurality of second sensing values being normal sensing values, and a plurality of first color light-emitting units corresponding to the plurality of first sensing values being arranged successively;

acquiring a plurality of rearranged sensing values by rearranging the plurality of sensing values, wherein first color light-emitting units corresponding to at least some of the plurality of first sensing values in the plurality of rearranged sensing values are different from the first color light-emitting units corresponding to the at least some of the plurality of first sensing values prior to rearrangement; and adjusting the plurality of first color light-emitting units in the display panel based on the plurality of rearranged sensing values.

16. The method according to claim 15, wherein the plurality of first color light-emitting units in the display panel are arranged in rows and columns, and the plurality of first sensing values comprises at least one column of first sensing values.

17. The method according to claim 16, wherein acquiring the plurality of rearranged sensing values by rearranging the plurality of sensing values comprises:

determining K sensing values for exchange from the plurality of second sensing values in a target region of the display panel, wherein K is a positive integer; and acquiring the plurality of rearranged sensing values by mutually exchanging the K sensing values for exchange with K first sensing values.

18. The method according to claim 16, wherein prior to rearranging the plurality of sensing values, the method further comprises:

determining any of the sensing values as the first sensing value in response to the sensing value being greater than or less than two sensing values adjacent to the sensing value in a row direction; and determining sensing values in the plurality of sensing values other than the first sensing value as the second sensing values.

19. A computer storage medium, storing at least one instruction, at least one program, a code set, and an instruction set, wherein the at least one instruction, the at least one program, the code set, and the instruction set, when loaded and executed by a processor, cause the processor to perform the method for adjusting the display device as defined in claim 15.

20. A device for adjusting a display device, comprising: a processor and a memory storing at least one instruction, at least one program, a code set, and an instruction set, wherein the processor, when loading and executing the at least one instruction, the at least one program, the code set, and the instruction set, is caused to:

acquire a plurality of sensing values corresponding to a plurality of first color light-emitting units in the display panel, wherein the plurality of sensing values comprise a plurality of first sensing values and a plurality of second sensing values, the plurality of first sensing values being abnormal sensing values, the plurality of second sensing values being normal sensing values, and a plurality of first color light-emitting units corresponding to the plurality of first sensing values being arranged successively:

acquire a plurality of rearranged sensing values by rearranging the plurality of sensing values, wherein first color light-emitting units corresponding to at least some of the plurality of first sensing values in the plurality of rearranged sensing values are different from the first color light-emitting units corresponding to the at least some of the plurality of first sensing values prior to rearrangement; and adjust the plurality of first color light-emitting units in the display panel based on the plurality of rearranged sensing values.

* * * * *